(12) United States Patent
Nagae et al.

(10) Patent No.: US 12,105,047 B2
(45) Date of Patent: Oct. 1, 2024

(54) SENSOR ELEMENT AND GAS SENSOR WITH ENHANCED WATERPROOFING

(71) Applicant: NGK INSULATORS, LTD., Aichi (JP)

(72) Inventors: Tomoki Nagae, Nagoya (JP);
Yoshimasa Kondo, Nagoya (JP);
Yusuke Ogiso, Nagakute (JP);
Katsunao Uenishi, Nagoya (JP);
Atsushi Watanabe, Kasugai (JP);
Ayato Koizumi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 520 days.

(21) Appl. No.: 17/411,082

(22) Filed: Aug. 25, 2021

(65) Prior Publication Data

US 2021/0381999 A1 Dec. 9, 2021

Related U.S. Application Data

(63) Continuation of application No. PCT/JP2019/050714, filed on Dec. 24, 2019.

(30) Foreign Application Priority Data

Feb. 26, 2019 (JP) .................. 2019-033351
Nov. 5, 2019 (JP) .................. 2019-200859
Nov. 22, 2019 (JP) .................. 2019-211702

(51) Int. Cl.
*G01N 27/407* (2006.01)
(52) U.S. Cl.
CPC ..... *G01N 27/4074* (2013.01); *G01N 27/4076* (2013.01); *G01N 27/4077* (2013.01); *G01N 27/4078* (2013.01)

(58) Field of Classification Search
CPC .......... G01N 27/4074; G01N 27/4076; G01N 27/4077; G01N 27/4078
See application file for complete search history.

(56) References Cited

U.S. PATENT DOCUMENTS 11,268,929 B2 * 3/2022 Watanabe .......... G01N 27/4072
11,879,865 B2 * 1/2024 Watanabe ............ G01N 27/419
(Continued)

FOREIGN PATENT DOCUMENTS

CN 103018308 A * 4/2013 ......... G01N 27/4077
CN 104345081 A 2/2015
(Continued)

OTHER PUBLICATIONS

International Preliminary Report on Patentability received in corresponding International Application No. PCT/JP2019/050714 dated Sep. 10, 2021.

(Continued)

*Primary Examiner* — Andre J Allen
(74) *Attorney, Agent, or Firm* — MATTINGLY & MALUR, PC

(57) ABSTRACT

A sensor element includes an element body having a measurement-object gas flow section formed therein, and a porous protective layer arranged to cover first to fifth surfaces of the element body. When an external wall that is the thinnest of parts of an external wall which constitute the element body and extend from the measurement-object gas flow section to the first to fifth surfaces is defined as a thinnest external wall and a surface corresponding to the thinnest external wall is defined as a closest surface, a part of the protective layer which covers the closest surface overlaps the entirety of the thinnest external wall when viewed in a direction perpendicular to the closest surface, and has one or more internal spaces formed therein which (Continued)

overlaps 80% or more of the thinnest external wall when viewed in the direction perpendicular to the closest surface.

14 Claims, 9 Drawing Sheets

(56) References Cited

U.S. PATENT DOCUMENTS

| | | | |
|---|---|---|---|
| 2015/0040642 A1 | 2/2015 | Oya | |
| 2016/0282298 A1 | 9/2016 | Hino et al. | |
| 2016/0282299 A1* | 9/2016 | Hino | G01N 27/41 |
| 2016/0282301 A1 | 9/2016 | Ino et al. | |
| 2020/0072785 A1* | 3/2020 | Watanabe | G01N 27/4072 |
| 2020/0116666 A1* | 4/2020 | Onishi | G01N 27/4074 |

FOREIGN PATENT DOCUMENTS

| | | | | |
|---|---|---|---|---|
| DE | 10154869 C1 * | 5/2003 | | G01N 27/4071 |
| JP | 2012-168030 A | 9/2012 | | |
| JP | 2015-34782 A | 2/2015 | | |
| JP | 2016-188856 A | 2/2015 | | |
| JP | 2016-188853 A | 11/2016 | | |

OTHER PUBLICATIONS

International Search Report of PCT/JP2019/050714 dated Mar. 10, 2020.
Chinese Office Action received in corresponding Chinese Application No. 201980090927.X dated Sep. 26, 2023.

* cited by examiner

SENSOR ELEMENT AND GAS SENSOR WITH ENHANCED WATERPROOFING

CROSS-REFERENCE TO RELATED APPLICATION

This application is a continuation application of PCT/JP2019/050714, filed on Dec. 24, 2019, which claims the benefit of priority of Japanese Patent Application No. 2019-033351, filed on Feb. 26, 2019, Japanese Patent Application No. 2019-200859, filed Nov. 5, 2019, and Japanese Patent Application No. 2019-211702, filed on Nov. 22, 2019, the entire contents of which are incorporated herein by reference.

BACKGROUND OF THE INVENTION

1. Field of the Invention

The present invention relates to a sensor element and a gas sensor.

2. Description of the Related Art

Gas sensors including a sensor element that detects the concentration of a specific gas, such as NOx, in a measurement-object gas, such as an automobile exhaust gas, are known. It is also known that some of these gas sensors include a protective layer that covers the surface of the sensor element, the protective layer having a space formed therein (e.g., PTL 1). In PTL 1, the protective layer has an exposure space at which the surface of the element body is exposed. The exposure space limits a reduction in the temperature of the element body which may occur when water is adhered onto the surface of the protective layer and thereby enhances the waterproofing performance of the element body.

CITATION LIST

Patent Literature

PTL 1: JP 2016-188853 A

SUMMARY OF THE INVENTION

The sensor element includes a measurement-object gas flow section formed therein, through which a measurement-object gas is introduced and flows. In the case where water is adhered to the sensor element, a part of the element body which extends from the measurement-object gas flow section to the surface of the element body is relatively likely to crack. In PTL 1, the positional relationship between the measurement-object gas flow section and the space formed in the protective layer is not discussed.

The present invention was made in order to address the above issues. A main object is to enhance the waterproofing performance of the element body of the sensor element.

In the present invention, the following measures were adopted so as to achieve the main object.

A first sensor element according to the present invention includes:

an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;

a measurement electrode disposed on an inner peripheral surface of the measurement-object gas flow section; and a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side, wherein, when the thinnest of external walls constituting the element body, the external walls extending from the measurement-object gas flow section to the first to fifth surfaces, is defined as a thinnest external wall and one of the first to fifth surfaces which corresponds to the thinnest external wall is defined as a closest surface, a part of the protective layer which covers the closest surface overlaps the entirety of the thinnest external wall when viewed in a direction perpendicular to the closest surface, and wherein the part of the protective layer which covers the closest surface has one or more internal spaces formed therein, the one or more internal spaces overlapping 80% or more of the thinnest external wall when viewed in the direction perpendicular to the closest surface.

In the first sensor element, the thinnest of external walls constituting the element body which extend from the measurement-object gas flow section to the first to fifth surfaces is defined as a thinnest external wall, and one of the first to fifth surfaces which corresponds to the thinnest external wall is defined as a closest surface. In the first sensor element, a part of the protective layer which covers the closest surface overlaps the entirety of the thinnest external wall when viewed in a direction perpendicular to the closest surface. In other words, the part of the protective layer which covers the closest surface covers the entirety of the thinnest external wall. This reduces the cracking of the thinnest external wall in the first sensor element compared with the case where the thinnest external wall is not covered with the protective layer and is exposed to the outside. Furthermore, the part of the protective layer which covers the closest surface has one or more internal spaces formed therein which overlap 80% or more of the thinnest external wall when viewed in the direction perpendicular to the closest surface. This enables the conduction of heat from the outside of the protective layer toward the thinnest external wall in the thickness direction of the protective layer to be suppressed by the one or more internal spaces. Consequently, the cracking of the thinnest external wall may be further reduced. Since the thinnest external wall, which is thin, is relatively vulnerable to thermal shock among the parts of the element body, the protective layer and the one or more internal spaces reducing the cracking of the thinnest external wall enhance the waterproofing performance of the element body.

In the first sensor element, when external walls extending from the measurement-object gas flow section to the first to fifth surfaces are defined as first to fifth external walls, respectively, the element body does not necessarily include all of the first to fifth external walls. For example, the element body does not necessarily include the fifth external wall.

A second sensor element according to the present invention includes:

an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;

a measurement electrode disposed on an inner peripheral surface of the measurement-object gas flow section; and a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side, wherein a longitudinal direction of the measurement-object gas flow section is the same as the longitudinal direction of the element body, wherein the element body includes first to fifth external walls extending from the measurement-object gas flow section to the first to fifth surfaces, respectively, wherein, when the thinnest of the first to fourth external walls is defined as a thinnest external wall and one of the first to fourth surfaces which corresponds to the thinnest external wall is defined as a closest surface, a part of the protective layer which covers the closest surface overlaps the entirety of the thinnest external wall when viewed in a direction perpendicular to the closest surface, and wherein the part of the protective layer which covers the closest surface has one or more internal spaces formed therein, the one or more internal spaces overlapping 80% or more of the thinnest external wall when viewed in the direction perpendicular to the closest surface.

In the second sensor element, the thinnest of the first to fourth external walls constituting the element body which extend from the measurement-object gas flow section to the first to fourth surfaces, respectively, is defined as a thinnest external wall, and one of the first to fourth surfaces which corresponds to the thinnest external wall is defined as a closest surface. In the second sensor element, a part of the protective layer which covers the closest surface overlaps the entirety of the thinnest external wall when viewed in a direction perpendicular to the closest surface. In other words, the part of the protective layer which covers the closest surface covers the entirety of the thinnest external wall. This reduces the cracking of the thinnest external wall in the second sensor element compared with the case where the thinnest external wall is not covered with the protective layer and is exposed to the outside. Furthermore, the part of the protective layer which covers the closest surface has one or more internal spaces formed therein which overlap 80% or more of the thinnest external wall when viewed in the direction perpendicular to the closest surface. This enables the conduction of heat from the outside of the protective layer toward the thinnest external wall in the thickness direction of the protective layer to be suppressed by the one or more internal spaces. Consequently, the cracking of the thinnest external wall may be further reduced. Since the thinnest external wall, which is thin, is relatively vulnerable to thermal shock among the parts of the element body, the protective layer and the one or more internal spaces reducing the cracking of the thinnest external wall enhance the waterproofing performance of the element body. In the second sensor element, the thinnest of the first to fourth external walls is defined as a thinnest external wall without regard for the fifth external wall. The reason is described below. In the second sensor element, the longitudinal direction of the measurement-object gas flow section is the same as that of the element body. Therefore, when the first to fifth external walls are each viewed in a direction perpendicular to a corresponding one of the first to fifth surfaces, the apparent size (area) of the fifth external wall is the smallest. Thus, the fifth external wall is resistant to cracking accordingly. Thus, in the second sensor element, it is possible to enhance the waterproofing performance of the element body even in the case where the protective layer and the internal spaces thereof are arranged such that the cracking of the thinnest external wall selected from the first to fourth external walls without regard for the fifth external wall is reduced. In the above case, the fifth external wall may be the thinnest of the first to fifth external walls.

In the first and second sensor elements according to the present invention, the one or more internal spaces may overlap 100% of the thinnest external wall when viewed in the direction perpendicular to the closest surface. In such a case, the cracking of the thinnest external wall may be further reduced and, consequently, the waterproofing performance of the element body may be enhanced.

In the first and second sensor elements according to the present invention, for each of one or more of the first to fifth surfaces except the closest surface, a part of the protective layer which covers the surface may have one or more internal spaces formed therein, the one or more internal spaces overlapping 80% or more of one of the external walls which corresponds to the surface when viewed in a direction perpendicular to the surface. In such a case, the cracking of the one or more external walls other than the thinnest external wall may be reduced and, consequently, the waterproofing performance of the element body may be further enhanced.

In the first and second sensor elements according to the present invention, the external walls of the element body may include first to fifth external walls extending from the measurement-object gas flow section to the first to fifth surfaces, respectively. Furthermore, for each of four surfaces that are the first to fifth surfaces except the closest surface, a part of the protective layer which covers the surface may have one or more internal spaces formed therein, the one or more internal spaces overlapping 80% or more of one of the external walls which corresponds to the surface when viewed in a direction perpendicular to the surface. In such a case, the cracking of the four external walls other than the thinnest external wall may be reduced as well. In other words, the cracking of all of the first to fifth external walls may be reduced. This further enhances the waterproofing performance of the element body.

In the first and second sensor elements according to the present invention, the part of the protective layer which covers the closest surface may include an outer protective layer and an inner protective layer, the outer protective layer being arranged closer to the outside of the sensor element than the one or more internal spaces, the inner protective layer being arranged closer to the inside of the sensor element than the one or more internal spaces, the inner protective layer being arranged in contact with the closest surface. In such a case, the presence of the inner protective layer arranged in contact with the closest surface increases the thermal capacity of the element body (to be exact, the element body and the inner protective layer). Therefore, even if a thermal shock transmits from the outside to the element body through the one or more internal spaces, a sudden change in the temperature of the element body can be avoided. This further reduce the cracking of the thinnest external wall and consequently enhances the waterproofing performance of the element body.

In the first and second sensor elements according to the present invention, a gas inlet opens on the fifth surface of the element body, the gas inlet serving as an inlet of the measurement-object gas flow section, a part of the protective layer which covers the fifth surface may have an internal space formed therein, and a part of the protective layer which covers the first to fourth surfaces does not necessarily have an internal space directly communicated with the internal space formed in the part of the protective layer which covers the fifth surface. In such a case, the likelihood of the measurement-object gas, which moves toward the gas inlet in a direction perpendicular to the fifth surface, reaching a part of the protective layer which covers the first to fourth surfaces may be reduced. Consequently, the measurement-object gas may be readily introduced into the measurement-object gas flow section and quickly reach the measurement electrode. This results in an increase in the responsivity of the sensor element. Note that the expression "directly communicated" means that the above internal spaces are communicated with one another not through pores present in the protective layer.

A gas sensor according to the present invention includes the first or second sensor element according to any one of the above-described aspects. Therefore, the above gas sensor may have the same advantageous effects as the first and second sensor elements according to the present invention. That is, for example, the waterproofing performance of the element body may be enhanced.

DETAILED DESCRIPTION OF THE INVENTION

Figure 1:
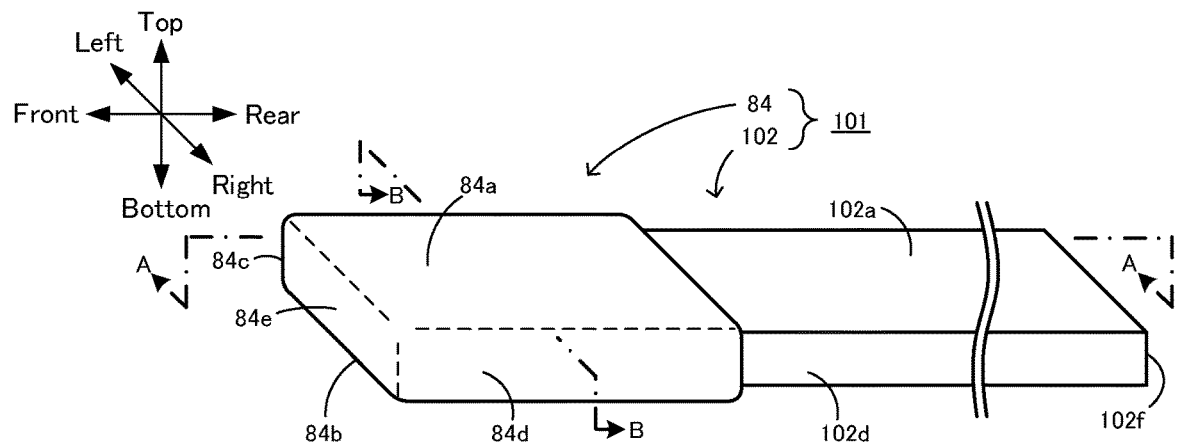
FIG. 1 is a perspective view of a sensor element 101.
Figure 2:
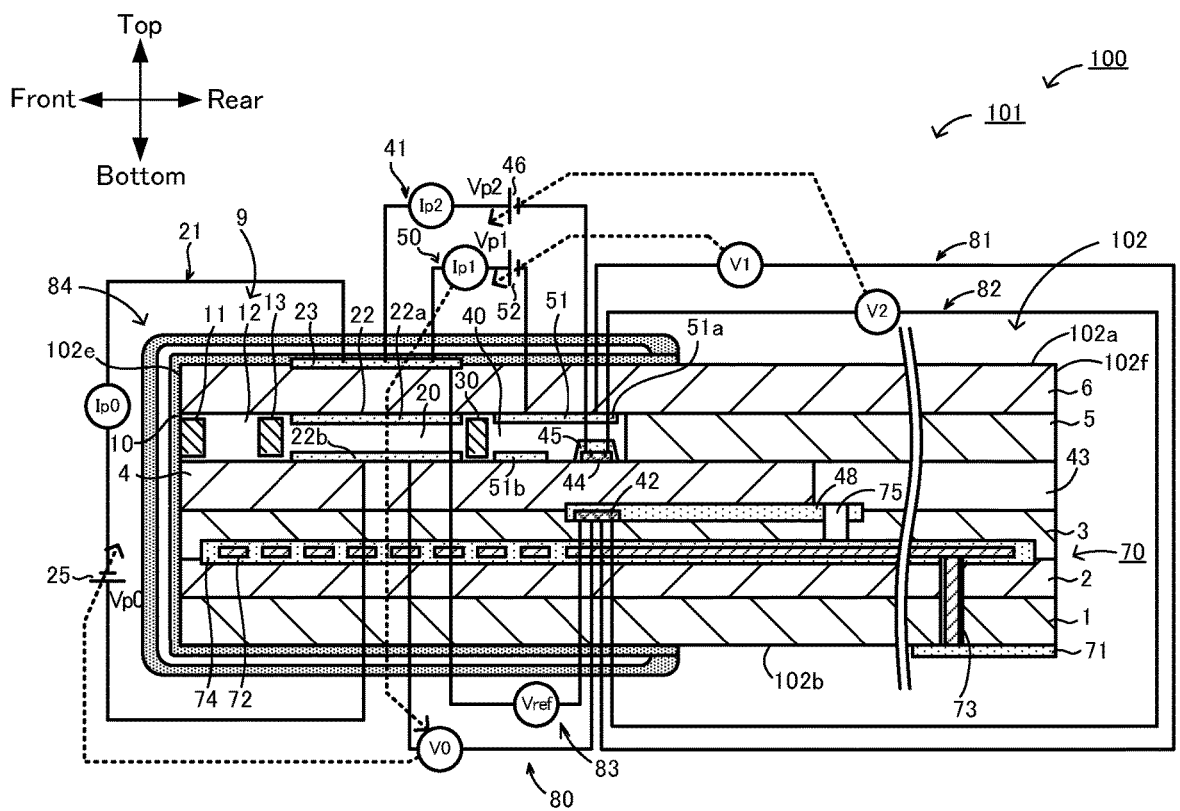
FIG. 2 is a cross-sectional view of a gas sensor 100, schematically illustrating the structure of the gas sensor 100.
Figure 3:
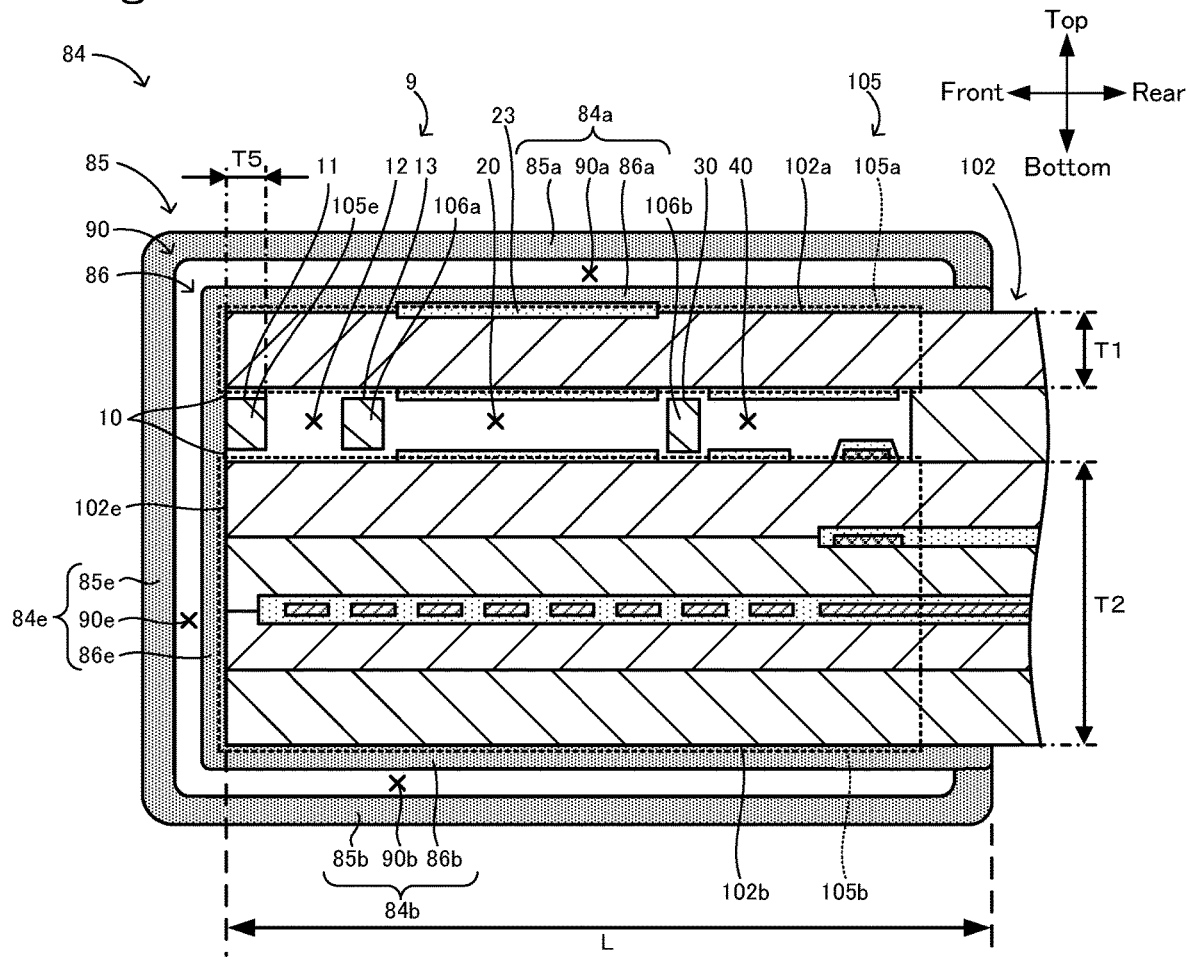
FIG. 3 is a magnified view of the periphery of the measurement-object gas flow section 9 illustrated in FIG. 2.
Figure 4:
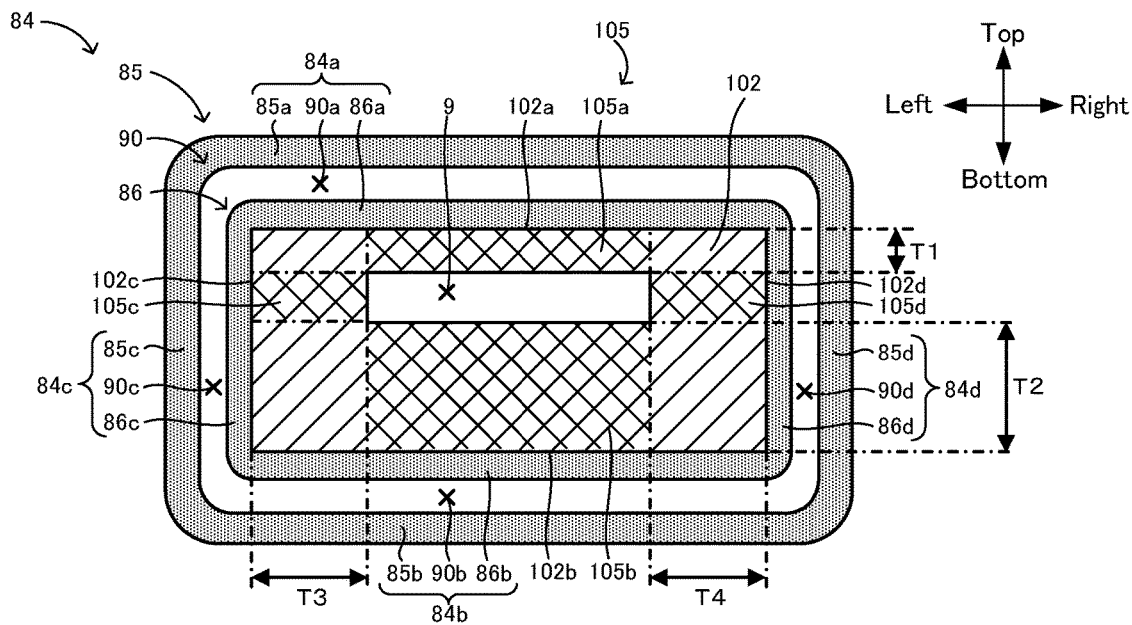
FIG. 4 is a cross-sectional view taken along the section B-B of FIG. 1.
Figure 5:
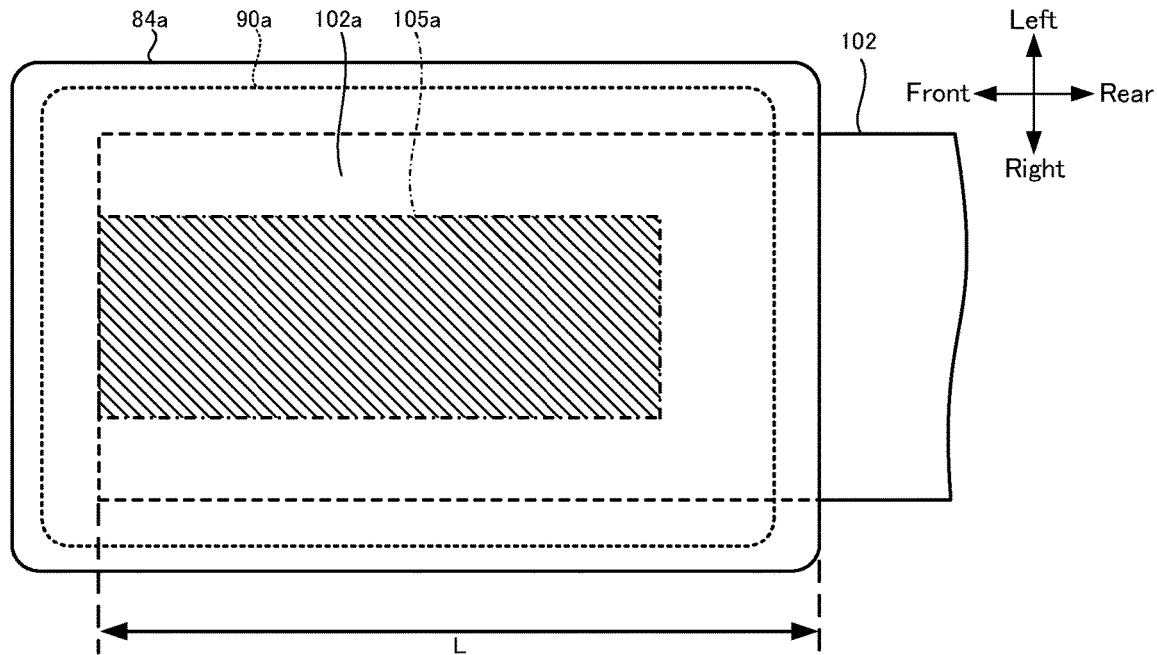
FIG. 5 is a partial top view of the sensor element 101.
Figure 6:
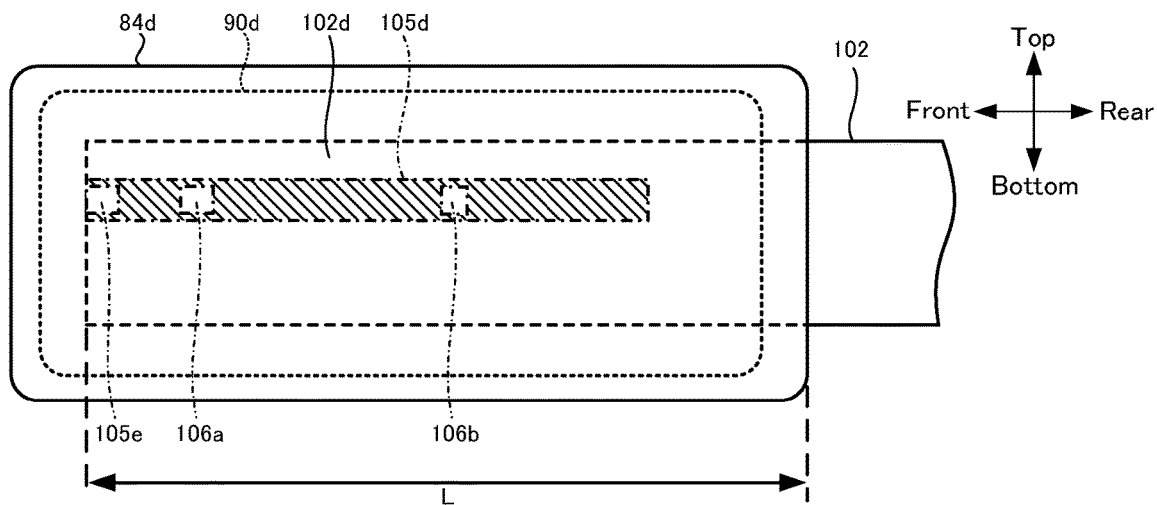
FIG. 6 is a partial right-side view of the sensor element 101.
Figure 7:
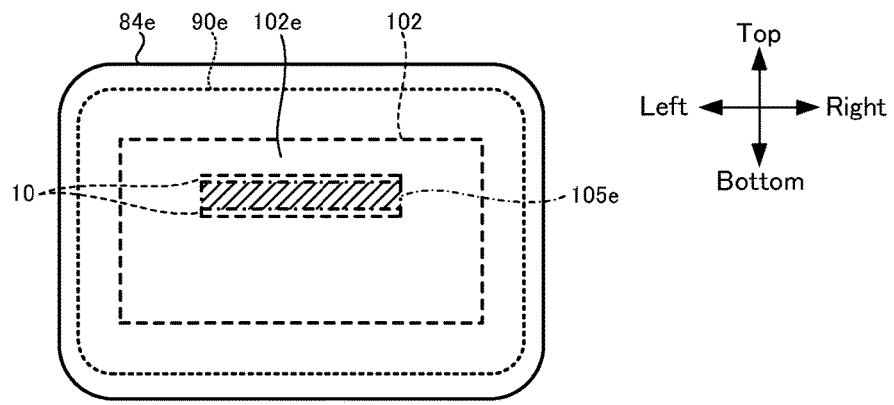
FIG. 7 is a front view of the sensor element 101.

An embodiment of the present invention is described below with reference to the attached drawings. FIG. 1 is a perspective view of a sensor element 101 included in a gas sensor 100 according to an embodiment of the present invention. FIG. 2 is a cross-sectional view of the gas sensor 100, schematically illustrating the structure of the gas sensor 100. The cross section of the sensor element 101 illustrated in FIG. 2 is the section A-A of FIG. 1. FIG. 3 is a magnified view of the periphery of the measurement-object gas flow section 9 illustrated in FIG. 2. FIG. 4 is a cross-sectional view taken along the section B-B of FIG. 1. FIG. 5 is a partial top view of the sensor element 101. FIG. 6 is a partial right-side view of the sensor element 101. FIG. 7 is a front view of the sensor element 101. Note that, in the cross-section illustrated in FIG. 4, the parts of the inside of the element body 102 which are other than the measurement-object gas flow section 9 or an external wall 105 are omitted. The sensor element 101 has an elongate rectangular parallelepiped shape. Hereinafter, the longitudinal direction of the sensor element 101 (the horizontal direction in FIG. 2) is referred to as "front-rear direction", the thickness direction of the sensor element 101 (the vertical direction in FIG. 2) is referred to as "top-bottom direction", and the width direction of the sensor element 101 (the direction perpendicular to the front-rear and top-bottom directions) is referred to as "left-right direction".

The gas sensor 100 is attached to a piping, such as an automobile exhaust gas pipe, and used for measuring the concentration of a specific gas, such as NOx or $O_2$, in the exhaust gas, which is a measurement-object gas. In this embodiment, the specific gas concentration measured by the gas sensor 100 is NOx concentration. The gas sensor 100 includes a sensor element 101. The sensor element 101 includes an element body 102 and a porous protective layer 84 arranged to cover the element body 102. Note that the element body 102 is a part of the sensor element 101 which is other than the protective layer 84.

As illustrated in FIG. 2, the sensor element 101 is an element having a structure in which six layers composed of a first substrate layer 1, a second substrate layer 2, a third substrate layer 3, a first solid electrolyte layer 4, a spacer layer 5, and a second solid electrolyte layer 6, each being formed from an oxygen ion-conductive solid electrolyte layer of zirconia (ZrO2) or the like, are stacked in that order from the bottom side in FIG. 2. Also, the solid electrolyte constituting these six layers is dense and airtight. The above-described sensor element 101 is produced by, for example, subjecting ceramic green sheets corresponding to the individual layers to predetermined processing, printing of circuit patterns, and the like, stacking them thereafter, and further performing firing so as to integrate the ceramic green sheets.

In one front end portion (frontward end portion) of the sensor element 101 and between the lower surface of the second solid electrolyte layer 6 and the upper surface of the first solid electrolyte layer 4, a gas inlet 10, a first diffusion-controlled portion 11, a buffer space 12, a second diffusion-controlled portion 13, a first internal space 20, a third diffusion-controlled portion 30, and a second internal space 40 are formed in that order so as to adjoin and communicate.

The gas inlet 10, the buffer space 12, the first internal space 20, and the second internal space 40 are spaces in the inside of the sensor element 101 by hollowing the spacer layer 5, where the upper portion is defined by the lower surface of the second solid electrolyte layer 6, the lower portion is defined by the upper surface of the first solid electrolyte layer 4, and the side portions are defined by the side surfaces of the spacer layer 5.

The first diffusion-controlled portion 11, the second diffusion-controlled portion 13, and the third diffusion-controlled portion 30 are each formed as a pair of horizontal slits (the longitudinal direction of the openings is perpendicular to the drawing). Hereinafter, the space extending from the gas inlet 10 to the second internal space 40 is referred to as "measurement-object gas flow section 9". The measurement-object gas flow section 9 is formed in a substantially rectangular parallelepiped shape. The longitudinal direction of the measurement-object gas flow section 9 is parallel to the front-rear direction.

Meanwhile, at the position farther from the front end side than the measurement-object gas flow section 9, a reference gas introduction space 43 is provided at the location between the upper surface of the third substrate layer 3 and the lower surface of the spacer layer 5, where the side portions are defined by the side surfaces of the first solid electrolyte layer 4. For example, the air serving as the reference gas at the time of measurement of the NOx concentration is introduced into the reference gas introduction space 43.

An air introduction layer 48 is a layer composed of porous ceramics. The reference gas is introduced into the air introduction layer 48 through the gas introduction space 43. Also, the air introduction layer 48 is formed so as to cover a reference electrode 42.

The reference electrode 42 is an electrode formed so as to be sandwiched between the upper surface of the third substrate layer 3 and the first solid electrolyte layer 4 and, as described above, the air introduction layer 48 connected to the reference gas introduction space 43 is provided around the reference electrode 42. In addition, as described later, it is possible to measure the oxygen concentrations (oxygen partial pressures) in the first internal space 20 and the second internal space 40 by using the reference electrode 42.

In the measurement-object gas flow section 9, the gas inlet 10 is a part made open to the outside space, and the gas to be measured is taken from the outside space into the sensor element 101 through the gas inlet 10. The first diffusion-controlled portion 11 is a part for giving predetermined diffusion resistance to the gas to be measured, where the gas is taken from the gas inlet 10. The buffer space 12 is a space provided so as to lead the gas to be measured, where the gas is introduced from the first diffusion-controlled portion 11, to the second diffusion-controlled portion 13. The second diffusion-controlled portion 13 is a part for giving predetermined diffusion resistance to the gas to be measured, where the gas is introduced from the buffer space 12 to the first internal space 20. When the gas to be measured is introduced from the outside of the sensor element 101 into the first internal space 20, the gas to be measured, which is taken into the sensor element 101 through the gas inlet 10 rapidly because of the pressure fluctuation of the gas to be measured in the outside space (pulsation of an exhaust pressure in the case where the gas to be measured is an automotive exhaust gas), is not directly introduced into the first internal space 20 but introduced into the first internal space 20 after pressure fluctuation of the gas to be measured are canceled through the first diffusion-controlled portion 11, the buffer space 12, and the second diffusion-controlled portion 13. Consequently, pressure fluctuation of the gas to be measured, which is introduced into the first internal space 20, are made to be at an almost negligible level. The first internal space 20 is provided as a space for adjusting the oxygen partial pressure in the gas to be measured which is introduced through the second diffusion-controlled portion 13. The above-described oxygen partial pressure is adjusted by actuation of a main pump cell 21.

The main pump cell 21 is an electrochemical pump cell composed of an inside pump electrode 22 having a ceiling electrode portion 22a provided on an almost entire surface of the lower surface of the second solid electrolyte layer 6 facing the first internal space 20, an outside pump electrode 23 provided in a region, which corresponds to the ceiling electrode portion 22a on the upper surface of the second solid electrolyte layer 6, and the second solid electrolyte layer 6 sandwiched between these electrodes.

The inside pump electrode 22 is formed so as to extend over the upper and lower solid electrolyte layers (second solid electrolyte layer 6 and first solid electrolyte layer 4) defining the first internal space 20 and the spacer layer 5 providing the side walls. Specifically, the ceiling electrode portion 22a is formed on the lower surface of the second solid electrolyte layer 6 providing the ceiling surface of the first internal space 20 and a bottom electrode portion 22b is formed on the upper surface of the first solid electrolyte layer 4 providing the bottom surface. Then, side electrode portions (not shown in the drawing) are formed on the side wall surfaces (inner surfaces) of the spacer layer 5 constituting both side wall portions of the first internal space 20 so as to connect the ceiling electrode portion 22a to the bottom electrode portion 22b. Thus, the inside pump electrode 22 is disposed in the form of a tunnel-like structure in a zone where the side electrode portions are disposed.

The inside pump electrode 22 and the outside pump electrode 23 are formed as porous cermet electrodes (for example, a cermet electrode of Pt containing 1% of Au and ZrO2). In this regard, the inside pump electrode 22 to contact with the gas to be measured is formed by using a material having weakened ability to reduce NOx components in the gas to be measured.

In the main pump cell 21, oxygen in the first internal space 20 can be pumped out to the outside space or oxygen in the outside space can be pumped into the first internal space 20 by applying a predetermined pump voltage Vp0 between the inside pump electrode 22 and the outside pump electrode 23 and passing a pump current Ip0 between the inside pump electrode 22 and the outside pump electrode 23 in the positive direction or negative direction.

In addition, in order to detect the oxygen concentration (oxygen partial pressure) in the atmosphere in the first internal space 20, an electrochemical sensor cell, that is, a main pump controlling oxygen partial pressure detection sensor cell 80 is constructed by the inside pump electrode 22, the second solid electrolyte layer 6, the spacer layer 5, the first solid electrolyte layer 4, the third substrate layer 3, and the reference electrode 42.

The oxygen concentration (oxygen partial pressure) in the first internal space 20 is determined by measuring the electromotive force V0 of the main pump controlling oxygen partial pressure detection sensor cell 80. Further, the pump current Ip0 is controlled by feedback-controlling the pump voltage Vp0 of a variable power supply 25 such that the electromotive force V0 becomes a target value. Consequently, the oxygen concentration in the first internal space 20 can be maintained at a predetermined constant value.

The third diffusion-controlled portion 30 is a part which gives predetermined diffusion resistance to the gas to be measured, the oxygen concentration (oxygen partial pressure) of the gas having been controlled by the operation of the main pump cell 21 in the first internal space 20, and leads the gas to be measured into the second internal space 40.

The second internal space 40 is provided as a space for performing a treatment related to the measurement of the nitrogen oxide (NOx) concentration in the gas to be measured that is introduced through the third diffusion-controlled portion 30. The NOx concentration is measured mainly in the second internal space 40 in which the oxygen concentration is adjusted by an auxiliary pump cell 50 and further the NOx concentration is measured by the operation of a measurement pump cell 41.

In the second internal space 40, the gas to be measured is further subjected to adjustment of the oxygen partial pressure by the auxiliary pump cell 50, the gas to be measured having been subjected to adjustment of the oxygen concentration (oxygen partial pressure) in the first internal space 20 in advance and, thereafter, having been introduced through the third diffusion-controlled portion 30. Consequently, the oxygen concentration in the second internal space 40 can be maintained constant with high accuracy and, therefore, the gas sensor 100 can measure the NOx concentration with high accuracy.

The auxiliary pump cell 50 is an auxiliary electrochemical pump cell constructed by an auxiliary pump electrode 51 having a ceiling electrode portion 51a provided on an almost entire surface of the lower surface of the second solid electrolyte layer 6 facing the second internal space 40, an outside pump electrode 23 (not limited to the outside pump electrode 23, and the sensor element 101 and an appropriate outside electrode will suffice), and the second solid electrolyte layer 6.

The above-described auxiliary pump electrode 51 is arranged in the second internal space 40 so as to have a similar tunnel-like structure to the above-described inside pump electrode 22 disposed in the first internal space 20. That is, a tunnel-like structure is constructed, in which the ceiling electrode portion 51a is formed on the second solid electrolyte layer 6 providing the ceiling surface of the second internal space 40, a bottom electrode portion 51b is formed on the first solid electrolyte layer 4 providing the bottom surface of the second internal space 40, and then, side electrode portions (not shown in the drawing) for connecting the ceiling electrode portion 51a to the bottom electrode portion 51b are formed on both side wall surfaces of the spacer layer 5 providing side walls of the second internal space 40. In this regard, the auxiliary pump electrode 51 is formed by using a material having weakened ability to reduce NOx components in the gas to be measured in the same manner as the inside pump electrode 22.

In the auxiliary pump cell 50, oxygen in the atmosphere in the second internal space 40 can be pumped out to the outside space or oxygen in the outside space can be pumped into the second internal space 40 by applying a predetermined pump voltage Vp1 between the auxiliary pump electrode 51 and the outside pump electrode 23.

In addition, in order to control the oxygen partial pressure in the atmosphere in the second internal space 40, an electrochemical sensor cell, that is, an auxiliary pump controlling oxygen partial pressure detection sensor cell 81 is constructed by the auxiliary pump electrode 51, the reference electrode 42, the second solid electrolyte layer 6, the spacer layer 5, the first solid electrolyte layer 4, and the third substrate layer 3.

In this regard, the auxiliary pump cell 50 performs pumping by a variable power supply 52 which is voltage-controlled on the basis of the electromotive force V1 detected by the auxiliary pump controlling oxygen partial pressure detection sensor cell 81. Consequently, the oxygen partial pressure in the atmosphere in the second internal space 40 is controlled to a low partial pressure that does not substantially affect the measurement of NOx.

In addition to this, the pump current Ip1 thereof is used for controlling the electromotive force of the main pump controlling oxygen partial pressure detection sensor cell 80. Specifically, the pump current Ip1 serving as a control signal is input into the main pump controlling oxygen partial pressure detection sensor cell 80, and by controlling the above-described target value of the electromotive force V0 thereof the gradient of the oxygen partial pressure in the gas to be measured, which is introduced from the third diffusion-controlled portion 30 into the second internal space 40, is controlled so as to be always constant. In the case of application as a NOx sensor, the oxygen concentration in the second internal space 40 is maintained at a constant value of about 0.001 ppm by the functions of the main pump cell 21 and the auxiliary pump cell 50.

The measurement pump cell 41 measures the NOx concentration in the gas to be measured in the second internal space 40. The measurement pump cell 41 is an electrochemical pump cell constructed by a measurement electrode 44 disposed on the upper surface of the first solid electrolyte layer 4 facing the second internal space 40 and at the position apart from the third diffusion-controlled portion 30, the outside pump electrode 23, the second solid electrolyte layer 6, the spacer layer 5, and the first solid electrolyte layer 4.

The measurement electrode 44 is a porous cermet electrode. The measurement electrode 44 also functions as a NOx reduction catalyst for reducing NOx present in the atmosphere in the second internal space 40. Further, the measurement electrode 44 is covered with a fourth diffusion-controlled portion 45.

The fourth diffusion-controlled portion 45 is a film composed of a ceramic porous body. The fourth diffusion-controlled portion 45 has a function of restricting the amount of NOx flowing into the measurement electrode 44 and, in addition, a function as a protective film for the measurement electrode 44. In the measurement pump cell 41, oxygen generated by decomposition of nitrogen oxides in the atmosphere around the measurement electrode 44 is pumped out and the amount of generation thereof can be detected as a pump current Ip2.

Also, in order to detect the oxygen partial pressure around the measurement electrode 44, an electrochemical sensor cell, that is, a measurement pump controlling oxygen partial pressure detection sensor cell 82 is constructed by the first solid electrolyte layer 4, the third substrate layer 3, the measurement electrode 44, and the reference electrode 42. A variable power supply 46 is controlled on the basis of the electromotive force V2 detected by the measurement pump controlling oxygen partial pressure detection sensor cell 82.

The gas to be measured, which is introduced into the second internal space 40, reaches the measurement electrode 44 through the fourth diffusion-controlled portion 45 under circumstances where the oxygen partial pressure is controlled. Nitrogen oxides in the gas to be measured around the measurement electrode 44 are reduced (2NO □N2+O2) and oxygen is generated. Then, the resulting oxygen is pumped by the measurement pump cell 41. At that time, the voltage Vp2 of the variable power supply 46 is controlled such that the control voltage V2 that is detected by the measurement pump controlling oxygen partial pressure detection sensor cell 82 is constant (target value). The amount of oxygen generated around the measurement electrode 44 is proportional to the concentration of the nitrogen oxides in the gas to be measured and, therefore, the nitrogen oxide concentration in the gas to be measured is calculated by using the pump current Ip2 in the measurement pump cell 41.

In addition, in the case where the measurement electrode 44, the first solid electrolyte layer 4, the third substrate layer 3, and the reference electrode 42 are combined so as to constitute an oxygen partial pressure detection device as an electrochemical sensor cell, the electromotive force in accordance with the difference between the amount of oxygen generated by reduction of NOx components in the atmosphere around the measurement electrode 44 and the amount of oxygen contained in the reference air can be detected and, thereby, the concentration of NOx components in the gas to be measured can be determined.

Further, an electrochemical sensor cell 83 is constructed by the second solid electrolyte layer 6, the spacer layer 5, the first solid electrolyte layer 4, the third substrate layer 3, the outside pump electrode 23, and the reference electrode 42. The oxygen partial pressure in the gas to be measured in the outside of the sensor can be detected by the electromotive force Vref obtained by the sensor cell 83.

In the gas sensor 100 having the above-described configuration, the gas to be measured, which has an oxygen partial pressure always maintained at a low constant value (value that does not substantially affect the measurement of NOx) by actuation of the main pump cell 21 and the auxiliary pump cell 50, is fed to the measurement pump cell 41. Therefore, the NOx concentration in the gas to be measured can be determined on the basis of the pump current Ip2 that flows because oxygen, which is generated by reduction of NOx nearly in proportion to the NOx concentration in the gas to be measured, is pumped out of the measurement pump cell 41.

Further, in order to enhance the oxygen ion conductivity of the solid electrolyte, the sensor element 101 includes a heater portion 70 having a function of adjusting the temperature including heating the sensor element 101 and keeping the temperature. The heater portion 70 includes a heater connector electrode 71, a heater 72, a through hole 73, a heater insulating layer 74, and a pressure release hole 75.

The heater connector electrode 71 is an electrode formed so as to contact with the lower surface of the first substrate layer 1. The electric power can be supplied from the outside to the heater portion 70 by connecting the heater connector electrode 71 to an external power supply.

The heater 72 is an electric resistor formed to be sandwiched between the second substrate layer 2 and the third substrate layer 3 in the vertical direction. The heater 72 is connected to the heater connector electrode 71 through the through hole 73 and generates heat by being supplied with an electric power from the outside through the heater connector electrode 71 so as to heat the solid electrolyte constituting the sensor element 101 and keep the temperature.

Also, the heater 72 is embedded over an entire range from the first internal space 20 to the second internal space 40 and the entirety of the sensor element 101 can be adjusted to have a temperature at which the above-described solid electrolyte is activated.

The heater insulating layer 74 is an insulating layer formed on the upper and lower surfaces of the heater 72 by using an insulator, e.g., alumina. The heater insulating layer 74 is formed for the purpose of establishing electrical insulation between the second substrate layer 2 and the heater 72 and electrical insulation between the third substrate layer 3 and the heater 72.

The pressure release hole 75 is a part provided so as to penetrate the third substrate layer 3 and communicate with the reference gas introduction space 43 and is formed for the purpose of reducing an internal pressure increase associated with a temperature increase in the heater insulating layer 74.

As illustrated in FIGS. 1 to 4, the element body 102 is partially covered with the porous protective layer 84. Since the sensor element 101 is rectangular parallelepiped, the element body 102 (specifically, the layers 1 to 6) has the following six external surfaces as illustrated in FIGS. 1 to 4: a first surface 102a (top surface), a second surface 102b (bottom surface), a third surface 102c (left-side surface), a fourth surface 102d (right-side surface), a fifth surface 102e (front-end surface), and a sixth surface 102f (rear-end surface). The protective layer 84 includes first to fifth protective layers 84a to 84e, which are each disposed on a corresponding one of the five surfaces (the first to fifth surfaces 102a to 102e) out of the six surfaces of the element body 102 (the first to sixth surfaces 102a to 102f). The fifth protective layer 84e covers the fifth surface 102e (see FIG. 3), which is one of the end surfaces of the element body 102 in the longitudinal direction (i.e., the front-rear direction). The first to fourth protective layers 84a to 84d each cover a corresponding one of the four surfaces (the first to fourth surfaces 102a to 102d) of the element body 102 which touch the fifth surface 102e along a side (see FIGS. 3 and 4). Hereinafter, the first to fifth protective layers 84a to 84e are referred to collectively as "protective layer 84". The protective layer 84 is arranged to cover and protect a part of the element body 102. For example, the protective layer 84 reduces the cracking of the element body 102 which may be caused due to the adhesion of moisture or the like included in the measurement-object gas.

As illustrated in FIGS. 3 and 4, the first protective layer 84a includes a first internal space 90a, a first outer protective layer 85a arranged closer to the outside than the first internal space 90a, and a first inner protective layer 86a arranged closer to the inside than the first internal space 90a. The first inner protective layer 86a is arranged in contact with the first surface 102a. The first inner protective layer 86a covers the outside pump electrode 23. Similarly, the second to fifth protective layers 84b to 84e include second to fifth internal spaces 90b to 90e, second to fifth outer protective layers 85b to 85e, and second to fifth inner protective layers 86b to 86e, respectively. The second to fifth inner protective layers 86b to 86e are arranged in contact with the second to fifth surfaces 102b to 102e, respectively. Hereinafter, the first to fifth outer protective layers 85a to 85e are referred to collectively as "outer protective layer 85", the first to fifth inner protective layers 86a to 86e are referred to collectively as "inner protective layer 86", and the first to fifth internal spaces 90a to 90e are referred to collectively as "internal space 90".

The first to fifth outer protective layers 85a to 85e are each joined to adjacent outer protective layers. The outer protective layer 85 covers the front end of the element body 102 as a whole. Similarly, the first to fifth inner protective layers 86a to 86e are each joined to adjacent inner protective layers. The inner protective layer 86 covers the front end of the element body 102 as a whole. The first to fifth internal spaces 90a to 90e are each directly communicated with adjacent internal spaces. The internal space 90 forms one space as a whole. Note that the expression "directly communicated" means that the above internal spaces are communicated with one another not through the pores present in the protective layer 84 (i.e., the outer protective layer 85 and the inner protective layer 86). The outer protective layer 85 and the inner protective layer 86 are arranged in contact with each other at only the rear end of the protective layer 84 (see FIG. 3). Specifically, the first outer protective layer 85a and the first inner protective layer 86a come into contact with each other at the rear end. Similarly, the second to fourth outer protective layers 85b to 85d come into contact with the second to fourth inner protective layers 86b to 86d, respectively, at the rear end. The outer protective layer 85 is supported at only the rear end of the outer protective layer 85 at which the outer protective layer 85 is in contact with the inner protective layer 86. The other part of the outer protective layer 85 is spaced from the inner protective layer 86 with the internal space 90 interposed therebetween.

The positional relationship among the protective layer 84, the measurement-object gas flow section 9, and an external wall 105 of the element body 102 is described in detail below. First, the external wall 105 is described. Parts of the element body 102 which extend from the measurement-object gas flow section 9 to the first to fifth surfaces 102a to 102e are referred to as "first to fifth external walls 105a to 105e", respectively. The first to fifth external walls 105a to 105e are referred to collectively as "external wall 105". As denoted with the broken line boxes of FIG. 3 and the hatch patterns of FIG. 4, the first external wall 105a is a part of the element body 102 which is located immediately above the measurement-object gas flow section 9. Similarly, the second external wall 105b is a part of the element body 102 which is located immediately below the measurement-object gas flow section 9 (see FIGS. 3 and 4). The third external wall 105c and the fourth external wall 105d are parts of the element body 102 which are located immediately beside (left and right of, respectively) the measurement-object gas flow section 9 (see FIG. 4). The fifth external wall 105e is a part of the element body 102 which is located forward of the measurement-object gas flow section 9 (see FIG. 3). The fifth external wall 105e is a part of the spacer layer 5 and is a wall portion for forming the gas inlet 10 and the first diffusion-controlled portion 11 (slit-like space). The first to fifth external walls 105a to 105e each include a part of the corresponding one of the surfaces (the first to fifth surfaces 102a to 102e) of the element body 102. Wall portions 106a and 106b (see FIG. 3), which are parts of the spacer layer 5 and are portions that form the second diffusion-controlled portion 13 and the third diffusion-controlled portion 30, respectively, of the measurement-object gas flow section 9, do not include a part of the surfaces of the element body 102, unlike the fifth external wall 105e. That is, the wall portions 106a and 106b are not the external walls but the inner walls of the measurement-object gas flow section 9. Therefore, the wall portions 106a and 106b are not included in the external wall 105.

When viewed in a direction perpendicular to the first surface 102a covered with the first protective layer 84a (i.e., when viewed in the direction from top to bottom), the first protective layer 84a overlaps the entirety of the first external wall 105a, that is, includes the entirety of the first external wall 105a (see FIG. 5). In FIG. 5, the first external wall 105a viewed in a direction perpendicular to the first surface 102a is denoted by a hatch pattern. The position and shape of the first external wall 105a viewed in a direction perpendicular to the first surface 102a are the same as those of the measurement-object gas flow section 9 projected on the first surface 102a in a direction perpendicular to the first surface 102a. When viewed in a direction perpendicular to the first surface 102a, the first protective layer 84a overlaps the entirety of a region of the first surface 102a which extends from the front end of the element body 102 a distance L rearward of the element body 102 (see FIGS. 3 and 5), and the above region also covers the entirety of the first external wall 105a. Similarly, when viewed in a direction perpen-dicular to the first surface 102a, each of the first outer protective layer 85a and the first inner protective layer 86a constituting the first protective layer 84a overlaps the entirety of the first external wall 105a and the entirety of the region of the first surface 102a which extends from the front end of the element body 102 a distance L rearward of the element body 102. When viewed in a direction perpendicular to the first surface 102a, the first internal space 90a overlaps 80% or more of the first external wall 105a. In this embodiment, the first internal space 90a overlaps 100% of the first external wall 105a. Hereinafter, the above proportion is referred to as "first overlap ratio". The first overlap ratio is the ratio of the area of a part of the apparent region (the part corresponding to first external wall 105a which is denoted by the hatch pattern of FIG. 5) of the first external wall 105a which overlaps the first internal space 90a when viewed in a direction perpendicular to the first surface 102a to the area of the apparent region of the first external wall 105a. The first overlap ratio being 100% means that the first internal space 90a covers the entirety of the first external wall 105a when viewed in a direction perpendicular to the first surface 102a. The same applies to the second to fifth overlap ratios described below.

Although not illustrated in the drawings, the second protective layer 84b is similar to the first protective layer 84a. Specifically, when viewed in a direction perpendicular to the second surface 102b (i.e., when viewed in the direction from bottom to top), the second protective layer 84b overlaps the entirety of the second external wall 105b and the entirety of a region of the second surface 102b which extends from the front end of the element body 102 a distance L rearward of the element body 102. The same applies to the second outer protective layer 85b and the second inner protective layer 86b. When viewed in a direction perpendicular to the second surface 102b, the second internal space 90b overlaps 80% or more (in this embodiment, 100%) of the second external wall 105b (hereinafter, the above proportion is referred to as "second overlap ratio").

The fourth protective layer 84d is similar to the first and second protective layers 84a and 84b. Specifically, when viewed in a direction perpendicular to the fourth surface 102d (i.e., when viewed in the direction from right to left), the fourth protective layer 84d overlaps the entirety of the fourth external wall 105d and the entirety of a region of the fourth surface 102d which extends from the front end of the element body 102 a distance L rearward of the element body 102 (see FIG. 6). The same applies to the fourth outer protective layer 85d and the fourth inner protective layer 86d. When viewed in a direction perpendicular to the fourth surface 102d, the fourth internal space 90d overlaps 80% or more (in this embodiment, 100%) of the fourth external wall 105d (hereinafter, the above proportion is referred to as "fourth overlap ratio"). When viewed from a direction perpendicular to the fourth surface 102d, the measurement-object gas flow section 9 is absent in the regions where the fifth external wall 105e and the wall portions 106a and 106b are present. Thus, parts of the element body 102 which extends between the fifth external wall 105e and the fourth surface 102d, between the wall portion 106a and the fourth surface 102d, and between the wall portion 106b and the fourth surface 102d are not included in the fourth external wall 105d. Therefore, the regions in which the fifth external wall 105e and the wall portions 106a and 106b are present when viewed in a direction perpendicular to the fourth surface 102d are not included in the apparent region of the fourth external wall 105d (see the hatch pattern of FIG. 6).

Although not illustrated in the drawings, the third protective layer 84c is similar to the fourth protective layer 84d. Specifically, when viewed in a direction perpendicular to the third surface 102c (i.e., when viewed in the direction from left to right), the third protective layer 84c overlaps the entirety of the third external wall 105c and the entirety of a region of the third surface 102c which extends from the front end of the element body 102 a distance L rearward of the element body 102. The same applies to the third outer protective layer 85c and the third inner protective layer 86c. When viewed in a direction perpendicular to the third surface 102c, the third internal space 90c overlaps 80% or more (in this embodiment, 100%) of the third external wall 105c (hereinafter, the above proportion is referred to as "third overlap ratio").

When viewed in a direction perpendicular to the fifth surface 102e (i.e., when viewed in the direction from front to rear), the fifth protective layer 84e overlaps the entirety of the fifth external wall 105e and the entirety of the fifth surface 102e (see FIG. 7). The same applies to the fifth outer protective layer 85e and the fifth inner protective layer 86e. When viewed in a direction perpendicular to the fifth surface 102e, the fifth internal space 90e overlaps 80% or more (in this embodiment, 100%) of the fifth external wall 105e (hereinafter, the above proportion is referred to as "fifth overlap ratio"). In FIG. 7, the fifth external wall 105e viewed in a direction perpendicular to the fifth surface 102e is denoted by a hatch pattern. When viewed in a direction perpendicular to the fifth surface 102e, the fifth internal space 90e covers the entirety of the fifth surface 102e. When viewed in a direction perpendicular to the fifth external wall 105e, the gas inlet 10 is covered with each of the fifth outer protective layer 85e and the fifth inner protective layer 86e. Since the protective layer 84 is a porous body, the measurement-object gas can flow inside the protective layer 84 and reach the gas inlet 10 and the inside of the measurement-object gas flow section 9.

As described above, the protective layer 84 is arranged to cover the external wall 105, which extends from the measurement-object gas flow section 9 to the surfaces of the element body 102. Moreover, the internal space 90 is formed so as to cover the external wall 105 (i.e., the first to fifth overlap ratios are 100%). This reduces the cracking of the external wall 105. The details are described below.

The distance L illustrated in FIGS. 3, 5, and 6 is determined in the range of (0<Distance L<Longitudinal length of element body 102) on the basis of the region of the gas sensor 100 in which the element body 102 is exposed to the measurement-object gas, the position of the measurement-object gas flow section 9, and the like. The distance L is also determined so as to be larger than the length of the measurement-object gas flow section 9 in the front-rear direction, which is formed inside the element body 102. Since the longitudinal direction of the measurement-object gas flow section 9 is the same as the longitudinal direction (i.e., the front-rear direction) of the element body 102 as illustrated in FIGS. 2 to 4, the distance L is larger than the longitudinal length of the measurement-object gas flow section 9. In this embodiment, the length of the element body 102 in the front-rear direction, the width of the element body 102 in the left-right direction, and the thickness of the element body 102 in the top-bottom direction are different from one another as illustrated in FIG. 1 such that Length>Width>Thickness. The distance L is larger than either the width or thickness of the element body 102.

The protective layer 84 is composed of a porous body, such as an alumina porous body, a zirconia porous body, a spinel porous body, a cordierite porous body, a titania porous body, or a magnesia porous body. In this embodiment, the protective layer 84 is composed of an alumina porous body. The thickness of the protective layer 84 is, for example, but not limited to, 100 to 1000 µm. The porosity of the protective layer 84 is, for example, but not limited to, 5% to 85%. The thickness of the outer protective layer 85 may be, for example, 50 to 800 µm. The thickness (height) of the inner protective layer 86 may be, for example, 5 to 50 µm. The thickness of the internal space 90 may be, for example, 5 to 600 µm. The porosities, materials, etc. of the outer protective layer 85 and the inner protective layer 86 may be different from each other. At least one of the outer protective layer 85 and the inner protective layer 86 may include a plurality of sublayers.

A method for producing the above-described gas sensor 100 is described below. In the method for producing the gas sensor 100, first, an element body 102 is produced. Subsequently, a protective layer 84 is formed on the element body 102 to produce a sensor element 101.

A method for producing the element body 102 is described below. First, six unbaked ceramic green sheets are prepared. A plurality of sheet holes used for performing positioning when printing is performed or the green sheets are stacked on top of one another, necessary through-holes, and the like are formed in each of the green sheets in accordance with a corresponding one of the layers 1 to 6. A space that is to serve as a measurement-object gas flow section 9 is formed, by punching or the like, in the green sheet that is to be formed into a spacer layer 5. Then, patterns such as electrodes and heaters are printed on each of the ceramic green sheets. Subsequent to the formation of the above patterns, the green sheets are dried. Subsequently, the green sheets are stacked on top of one another to form a layered body. A vanishing body (organic material, such as carbon or theobromine) capable of vanishing during baking may be charged into a part of the layered body which is to serve as a space such as a measurement-object gas flow section 9. The above layered body includes a plurality of element bodies 102. The layered body is cut into pieces having a size of the element body 102, which are then baked at a predetermined baking temperature. Hereby, an element body 102 is produced.

A method for forming a protective layer 84 on the element body 102 is described below. First, an inner protective layer 86 is formed on the surface of the element body 102. For forming the inner protective layer 86, various methods such as mold casting, screen printing, dipping, and plasma spraying may be used. In the case where the inner protective layer 86 is formed by screen printing or plasma spraying, the first to fifth inner protective layers 86a to 86e may be formed one by one. Subsequently, a vanishing body is applied to the inner protective layer 86, and the resulting coating film is dried to form a vanishing body having a shape of the internal space 90. The application of the vanishing body may be performed using screen printing, gravure printing, ink-jet printing, or the like. The vanishing body may be formed by repeatedly performing the above application and drying steps. Examples of the material of the vanishing body include the above-described organic materials, such as carbon and theobromine, and thermally degradable polymers, such as a vinyl resin. Subsequently, an outer protective layer 85 is formed on the outer surfaces of the inner protective layer 86 and the vanishing body. The outer protective layer 85 can be formed as in the formation of the inner protective layer 86. Hereby, a protective layer 84 including a vanishing body having a shape of the internal space 90 is formed.

Then, the vanishing body is vanished by performing combustion. As a result, the part in which the vanishing body was present serves as an internal space 90. That is, a protective layer 84 having an internal space 90 formed therein is formed. In the above-described manner, a protective layer 84 is formed on the element body 102 and, hereby, a sensor element 101 is produced. In the case where the protective layer 84 is formed by mold casting, screen printing, or dipping, a slurry that is to form the outer protective layer 85 and the inner protective layer 86 is solidified or dried and then baked to form a protective layer 84. In such a case, the baking of the protective layer 84 and the combustion of the vanishing body may be performed simultaneously. In the case where the outer protective layer 85 and the inner protective layer 86 are formed by plasma spraying, the vanishing body may be vanished by performing combustion subsequent to the formation of the above two protective layers.

In the case where the protective layer 84 includes a plurality of sublayers in the thickness direction (i.e., the outer protective layer 85 and the inner protective layer 86), the innermost later (i.e., the inner protective layer 86) is preferably formed by forming the slurry on the surface of the element body 102 by mold casting, screen printing, dipping, or the like and then baking the slurry together with the element body 102 in an integrated manner in order to form an inner protective layer 86. Since the surface of the element body 102 has a relatively small arithmetic average roughness Ra in many cases, the adhesion between the element body 102 and the inner protective layer 86, which is directly bonded to the element body 102, is likely small. Baking the slurry and the element body 102 in an integrated manner increases the adhesion between the element body 102 and the inner protective layer 86. A surface of the inner protective layer 86 which is to come into contact with the outer protective layer 85 (i.e., a rear-end part of the surface of the inner protective layer 86) preferably has a larger arithmetic average roughness Ra than the surface of the element body 102. In such a case, the adhesion between the inner protective layer 86 and the outer protective layer 85 can be increased. The arithmetic average roughness Ra of the surface of the inner protective layer 86 which is to come into contact with the outer protective layer 85 may be 1 μm or more and 10 μm or less and may be 1 μm or more and 5 μm or less. In addition to the surface of the inner protective layer 86 which is to come into contact with the outer protective layer 85, a surface of the inner protective layer 86 which is to be exposed to the internal space 90 may have an arithmetic average roughness Ra of 1 μm or more and 10 μm or less or an arithmetic average roughness Ra of 1 μm or more and 5 μm or less.

When the outer protective layer 85 is prepared, the entirety of the outer protective layer 85 (the first to fifth outer protective layers 85a to 85e) may be integrally formed as a protective layer having a cap-like shape (also referred to as "bottomed cylindrical shape" or "shape of a box with one side open"). For example, the outer protective layer 85 may be prepared by forming a cap-like unbaked body having a shape of the outer protective layer 85 by mold casting, inserting the front end-side part of the element body 102 (in the case where the inner protective layer 86 is present, the element body 102 and the inner protective layer 86) into the inside of the cap-like unbaked body, and subsequently baking the unbaked body. In the above case, forming the unbaked body in a shape having a space holding portion, such as a columnar or step-like portion, formed therein (therefore, the outer protective layer 85, which is produced by baking the unbaked body, has a space holding portion) enables the internal space 90 to be formed between the outer protective layer 85 and the element body 102 without using the vanishing body having a shape of the internal space 90 but using the space holding portion. In the case where the outer protective layer 85 is prepared by the method in which the element body 102 is inserted into the cap-like unbaked body, the internal space 90 formed between the outer protective layer 85 and the element body 102 may have an opening directed toward the rear end of the element body 102. In such a case, a sealing portion may be formed by plasma spraying or the like so as to block the opening. The sealing portion is preferably a porous body the principal constituent of which is the same as that of the outer protective layer 85.

After the sensor element 101 has been produced in the above-described manner, it is placed in a predetermined housing, which is then attached to a main body (not illustrated in the drawing) of a gas sensor 100 and connected to power supplies, etc. Hereby, a gas sensor 100 is produced.

While the above-described gas sensor 100 is used, a measurement-object gas present inside a piping reaches the sensor element 101 and enters the gas inlet 10 through the protective layer 84. The sensor element 101 detects the NOx concentration in the measurement-object gas that entered the gas inlet 10. At this time, moisture included in the measurement-object gas may adhere onto the surface of the sensor element 101. Since the temperature of the element body 102 is adjusted to be the temperature (e.g., 800° C.) at which the solid electrolyte is activated by the heater 72 as described above, a quick reduction in the temperature of the element body 102 caused by the moisture adhered may result in cracking of the element body 102 due to thermal shock. Since the element body 102 has the measurement-object gas flow section 9 formed therein as an internal space, the external wall 105, which extends from the measurement-object gas flow section 9 to the surfaces (the first to fifth surfaces 102a to 102e) of the element body 102, is relatively vulnerable to thermal shock compared with the other part of the element body 102. The thinnest part of the external wall 105, that is, a thinnest external wall, is particularly vulnerable to thermal shock. The thinnest external wall is defined in the following two ways. In the first definition, the thinnest external wall is defined as the thinnest of the first to fifth external walls 105a to 105e. In this embodiment, the thicknesses T1 to T5 of the first to fifth external walls 105a to 105e are set such that the following relationship is satisfied: T5<T1<T3=T4<T2 (see FIGS. 3 and 4). Therefore, under the first definition, the fifth external wall 105e is the thinnest external wall. In the second definition, the thinnest external wall is defined as the thinnest of the first to fourth external walls 105a to 105d without regard for the fifth external wall 105e. Therefore, under the second definition, the first external wall 105a is the thinnest external wall. Moreover, one of the first to fifth surfaces 102a to 102e which corresponds to the thinnest external wall is defined as a closest surface. Thus, the closest surface based on the first definition is the fifth surface 102e, while the closest surface based on the second definition is the first surface 102a.

The thinnest external wall based on the first definition (i.e., the fifth external wall 105e) is relatively vulnerable to thermal shock since it is the thinnest part of the external wall 105. On the other hand, in the second definition, the thinnest external wall is defined as the thinnest of the first to fourth external walls 105a to 105d without regard for the fifth external wall 105e. The reason is described below. In this embodiment, the longitudinal direction of the measurement-object gas flow section 9 is the same as the longitudinal direction of the element body 102. Therefore, when the first to fifth external walls 105a to 105e are each viewed in a direction perpendicular to the corresponding one of the first to fifth surfaces 102a to 102e, the apparent size (area) of the fifth external wall 105e is the smallest (see the hatch patterns of FIGS. 5 to 7). Thus, although the fifth external wall 105e is the thinnest, it is likely resistant to cracking since the apparent size is the smallest. In contrast, the first external wall 105a, which is the thinnest of the first to fourth external walls 105a to 105d, is thicker but has a larger apparent size than the fifth external wall 105e. Therefore, the first external wall 105a is also relatively vulnerable to thermal shock. As described above, in the case where the longitudinal direction of the measurement-object gas flow section 9 is the same as the longitudinal direction of the element body 102, the thinnest external wall based on the second definition (i.e., the first external wall 105a) is also relatively vulnerable to thermal shock. Thus, among the parts of the external wall 105, the external walls (i.e., the first and fifth external walls 105a and 105e) defined as a thinnest external wall based on any of the first and second definitions are likely vulnerable to thermal shock compared with the other parts of the external wall 105 (i.e., the second to fourth external walls 105b to 105d). Therefore, reducing the cracking of at least one of the first and fifth external walls 105a and 105e readily enhances the overall waterproofing performance of the element body 102.

In this respect, in this embodiment, among the parts of the protective layer 84, the fifth protective layer 84e that covers the fifth surface 102e, which is the closest surface based on the first definition, overlaps the entirety of the fifth external wall 105e, which is the thinnest external wall based on the first definition, when viewed in a direction perpendicular to the fifth surface 102e. In other words, the fifth protective layer 84e (specifically, the fifth outer protective layer 85e and the fifth inner protective layer 86e) covers the entirety of the fifth external wall 105e, which is the thinnest external wall. This reduces the cracking of the fifth external wall 105e in the sensor element 101 compared with the case where the fifth external wall 105e is not covered with the protective layer 84 and is exposed to the outside. In addition, the fifth protective layer 84e has the fifth internal space 90e that overlaps 80% or more of the fifth external wall 105e (the fifth overlap ratio is 80% or more) when viewed in a direction perpendicular to the fifth surface 102e. This enables the conduction of heat from the outside of the fifth protective layer 84e toward the fifth external wall 105e in the thickness direction of the fifth protective layer 84e (i.e., the front-rear direction) to be suppressed by the fifth internal space 90e. Consequently, the cracking of the fifth external wall 105e may be further reduced. As described above, the fifth protective layer 84e (in particular, the fifth outer protective layer 85e and the fifth inner protective layer 86e) and the fifth internal space 90e reduce the cracking of the fifth external wall 105e, which is the thinnest external wall based on the first definition. This enhances the waterproofing performance of the element body 102.

Furthermore, in this embodiment, among the parts of the protective layer 84, the first protective layer 84a that covers the first surface 102a, which is the closest surface based on the second definition, overlaps the entirety of the first external wall 105a, which is the thinnest external wall based on the second definition, when viewed in a direction perpendicular to the first surface 102a. In other words, the first protective layer 84a (specifically, the first outer protective layer 85a and the first inner protective layer 86a) covers the entirety of the first external wall 105a, which is the thinnest external wall. This reduces the cracking of the first external wall 105a in the sensor element 101 compared with the case where the first external wall 105a is not covered with the protective layer 84 and is exposed to the outside. In addition, the first protective layer 84a has the first internal space 90a that overlaps 80% or more of the first external wall 105a (the first overlap ratio is 80% or more) when viewed in a direction perpendicular to the first surface 102a. This enables the conduction of heat from the outside of the first protective layer 84a toward the first external wall 105a in the thickness direction of the first protective layer 84a (i.e., the top-bottom direction) to be suppressed by the first internal space 90a. Consequently, the cracking of the first external wall 105a may be further reduced. As described above, the first protective layer 84a (in particular, the first outer protective layer 85a and the first inner protective layer 86a) and the first internal space 90a reduce the cracking of the first external wall 105a, which is the thinnest external wall based on the second definition. This enhances the waterproofing performance of the element body 102.

In the gas sensor 100 according to this embodiment described above in detail, the fifth protective layer 84e of the protective layer 84 included in the sensor element 101 overlaps the entirety of the fifth external wall 105e when viewed in a direction perpendicular to the fifth surface 102e, which is the closest surface based on the first definition. Furthermore, the fifth overlap ratio of the fifth internal space 90e formed in the fifth protective layer 84e is 80% or more. This reduces the cracking of the fifth external wall 105e, which is the thinnest external wall based on the first definition and is relatively vulnerable to thermal shock among the parts of the element body 102, and consequently enhances the waterproofing performance of the element body 102.

Moreover, the first protective layer 84a of the protective layer 84 included in the sensor element 101 overlaps the entirety of the first external wall 105a when viewed in a direction perpendicular to the first surface 102a, which is the closest surface based on the second definition. Furthermore, the first overlap ratio of the first internal space 90a formed in the first protective layer 84a is 80% or more. This reduces the cracking of the first external wall 105a, which is the thinnest external wall based on the second definition and is relatively vulnerable to thermal shock among the parts of the element body 102, and consequently enhances the waterproofing performance of the element body 102.

In addition, since the overlap ratio of the fifth internal space 90e with respect to the thinnest wall portion based on the first definition (i.e., the fifth external wall 105e) is 100%, the cracking of the fifth external wall 105e is further reduced and, consequently, the waterproofing performance of the element body 102 is enhanced. Similarly, since the overlap ratio of the first internal space 90a with respect to the thinnest wall portion based on the second definition (i.e., the first external wall 105a) is 100%, the cracking of the first external wall 105a is further reduced and, consequently, the waterproofing performance of the element body 102 is enhanced.

Moreover, the first to fifth overlap ratios of the first to fifth internal spaces 90a to 90e with respect to the first to fifth external walls 105a to 105e, respectively, are all 80% or more (in this embodiment, 100%). Therefore, regardless of whether the first or second definition is used, the cracking of the four external walls other than the thinnest external wall can be also reduced. That is, the cracking of each of the first to fifth external walls 105a to 105e can be reduced. This further enhances the waterproofing performance of the element body 102.

The fifth protective layer 84e, which is a part of the protective layer 84 which covers the closest surface based on the first definition (i.e., the fifth surface 102e), includes the fifth outer protective layer 85e arranged closer to the outside than the fifth internal space 90e and the fifth inner protective layer 86e arranged closer to the inside than the fifth internal space 90e and arranged in contact with the fifth surface 102e. The presence of the fifth inner protective layer 86e arranged in contact with the fifth surface 102e, which is the closest surface, increases the thermal capacity of the element body 102 (to be exact, the element body 102 and the fifth inner protective layer 86e). Therefore, even if a thermal shock transmits from the outside to the element body 102 through the fifth internal space 90e, a sudden change in the temperature of the element body 102 can be avoided. This further reduces the cracking of the fifth external wall 105e and consequently enhances the waterproofing performance of the element body 102. In the case where the second definition is used, similarly, the presence of the first inner protective layer 86a arranged in contact with the first surface 102a, which is the closest surface, increases the thermal capacity of the element body 102 (to be exact, the element body 102 and the first inner protective layer 86a). This further reduces the cracking of the first external wall 105a and consequently enhances the waterproofing performance of the element body 102.

Furthermore, since the inner protective layer 86 of the sensor element 101 includes the first to fifth inner protective layers 86a to 86e arranged in contact with the first to fifth surfaces 102a to 102e, respectively, the thermal capacity of the element body 102 can be further increased and, consequently, the waterproofing performance of the element body 102 can be further enhanced.

In addition, in the sensor element 101, the first to fifth internal spaces 90a to 90e are directly communicated with one another, and the outer protective layer 85 and the inner protective layer 86 are arranged in contact with each other at only the rear end of the protective layer 84. Consequently, the area of contact between the outer protective layer 85 and the inner protective layer 86 is small. This enables the conduction of heat between the outer protective layer 85 and the inner protective layer 86 to be further suppressed by the internal space 90.

It is needless to say that the present invention is not limited to the foregoing embodiment and may be implemented in various aspects within the technical scope of the present invention.

For example, although the first to fifth overlap ratios of the first to fifth internal spaces 90a to 90e with respect to the first to fifth external walls 105a to 105e are all 100% in the above-described embodiment, the above first to fifth overlap ratios are not limited to 100% and may be 80% or more. Moreover, when viewed in a direction perpendicular to the closest surface, at least a part of the protective layer 84 which covers the closest surface overlaps the entirety of the thinnest external wall, and the overlap ratio of at least an internal space formed in the part of the protective layer 84 which covers the closest surface with respect to the thinnest external wall is 80% or more. That is, for example, one or more of the first to fourth protective layers 84a to 84d that cover the surfaces other than the closest surface based on the first definition do not necessarily have an internal space and do not necessarily cover the entirety of the corresponding one of the first to fourth external walls 105a to 105d.

Similarly, one or more of the second to fifth protective layers 84b to 84e that cover the surfaces other than the closest surface based on the second definition do not necessarily have an internal space and do not necessarily cover the entirety of the corresponding one of the second to fifth external walls 105b to 105e. For each of the surfaces (i.e., the first and fifth surfaces 102a and 102e) corresponding to the thinnest external wall and the thinnest of the parts of the external wall 105 which are other than the thinnest external wall (i.e., the first and fifth external walls 105a and 105e), a part of the protective layer 84 which covers the surface may overlap the entirety of the external wall when viewed in a direction perpendicular to the surface and the overlap ratio with respect to the external wall may be 80% or more.

Figure 8:
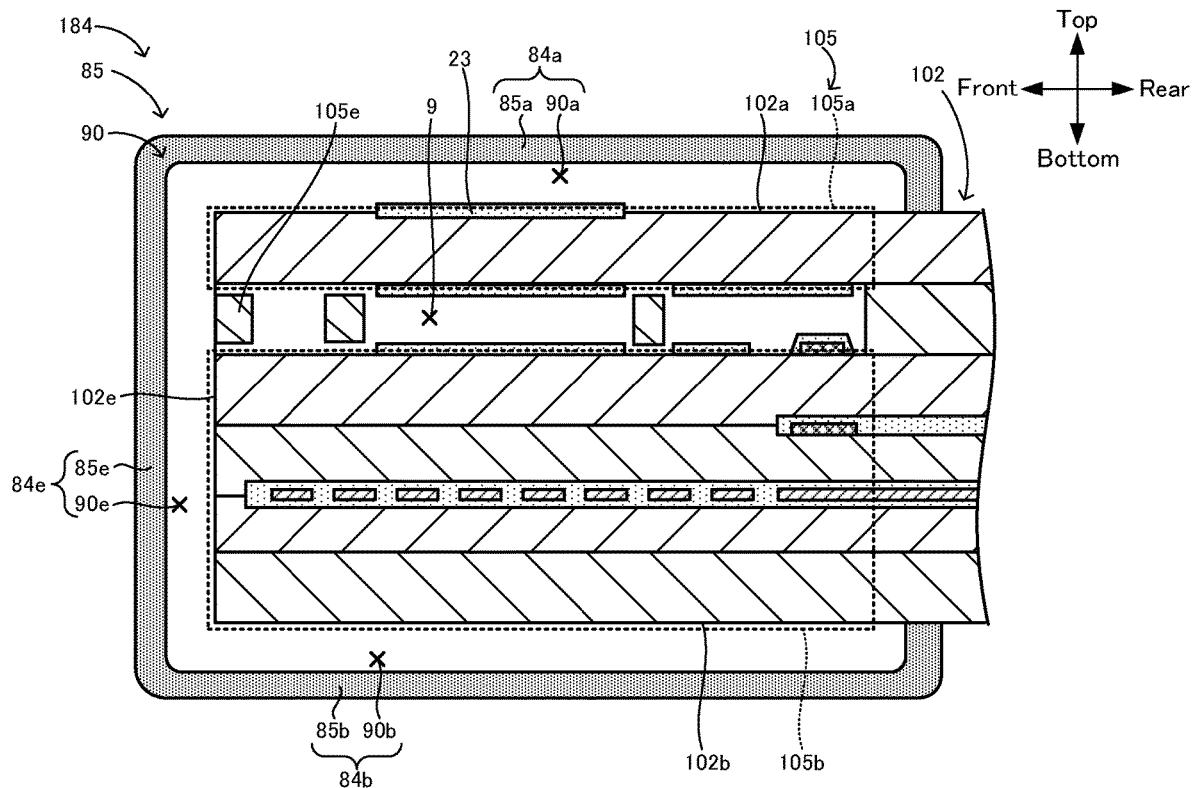
FIG. 8 is a cross-sectional view of a protective layer 184 according to a modification example.

Although the protective layer 84 includes the inner protective layer 86 and the element body 102 is not exposed to the internal space 90 in the above-described embodiment, the present invention is not limited to this. That is, for example, the protective layer 84 does not necessarily include the inner protective layer 86. FIG. 8 is a cross-sectional view of a protective layer 184 according to a modification example corresponding to the above case. The protective layer 184 includes an outer protective layer 85 and an internal space 90. The surfaces of the element body 102, that is, the first to fifth surfaces 102a to 102e, are exposed to the internal space 90.

Figure 9:
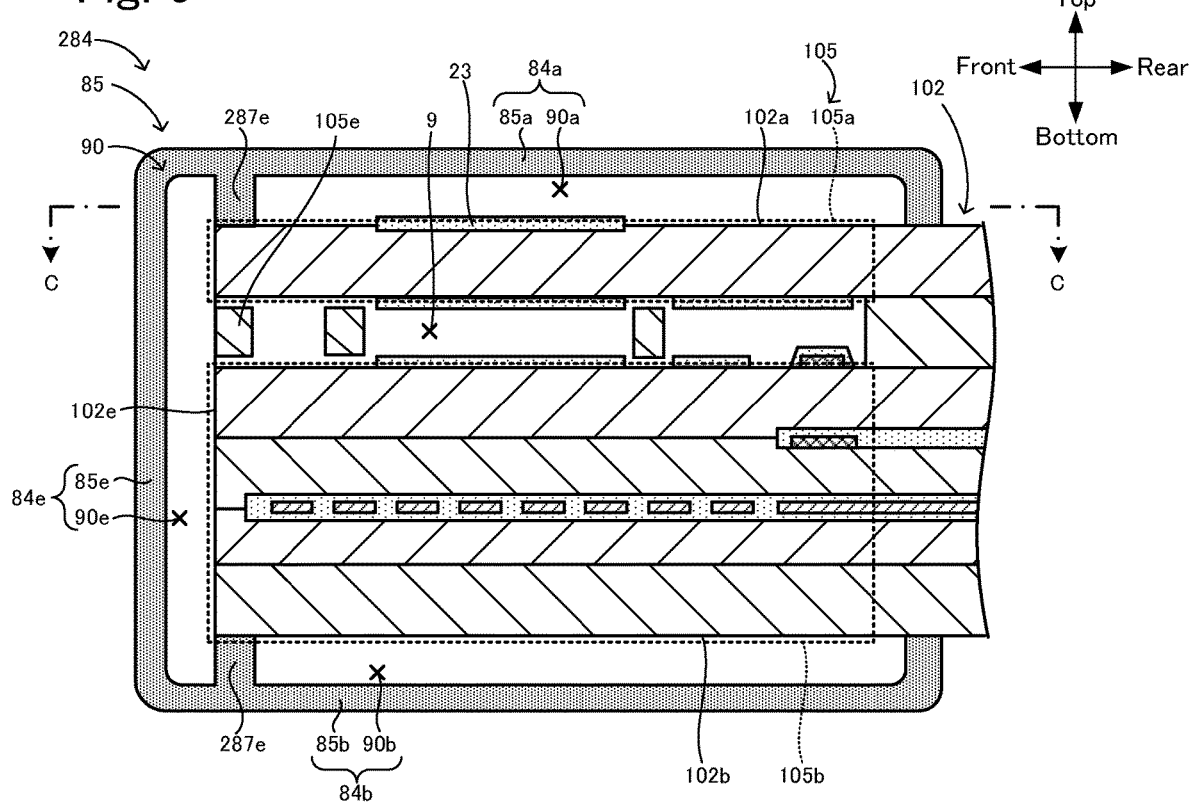
FIG. 9 is a cross-sectional view of a protective layer 284 according to a modification example.
Figure 10:
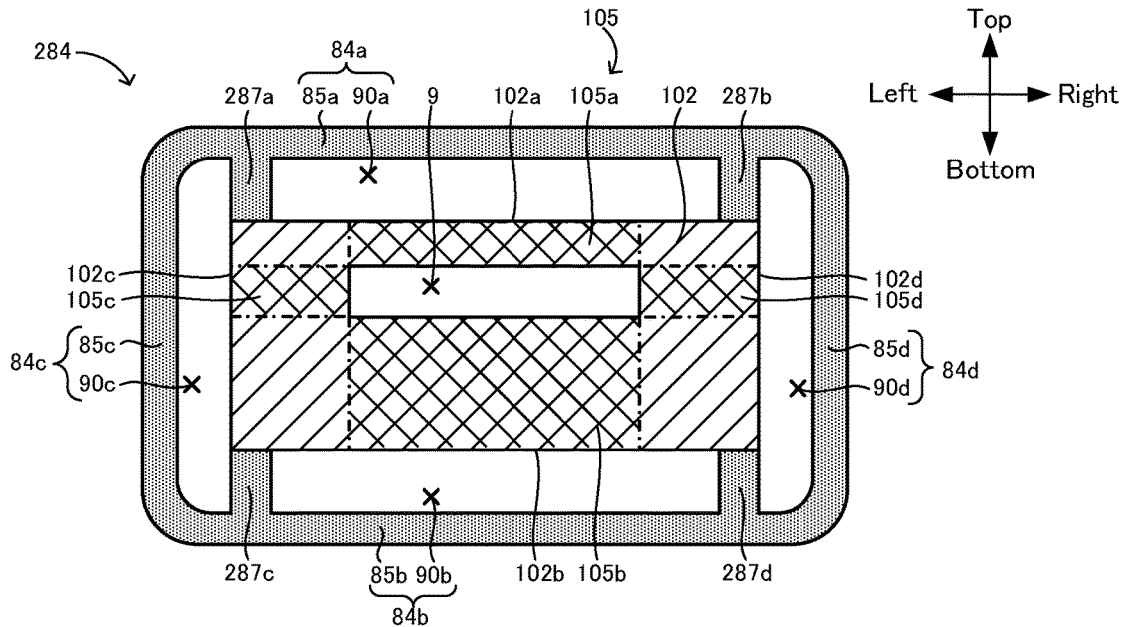
FIG. 10 is a cross-sectional view of the protective layer 284 according to a modification example.
Figure 11:
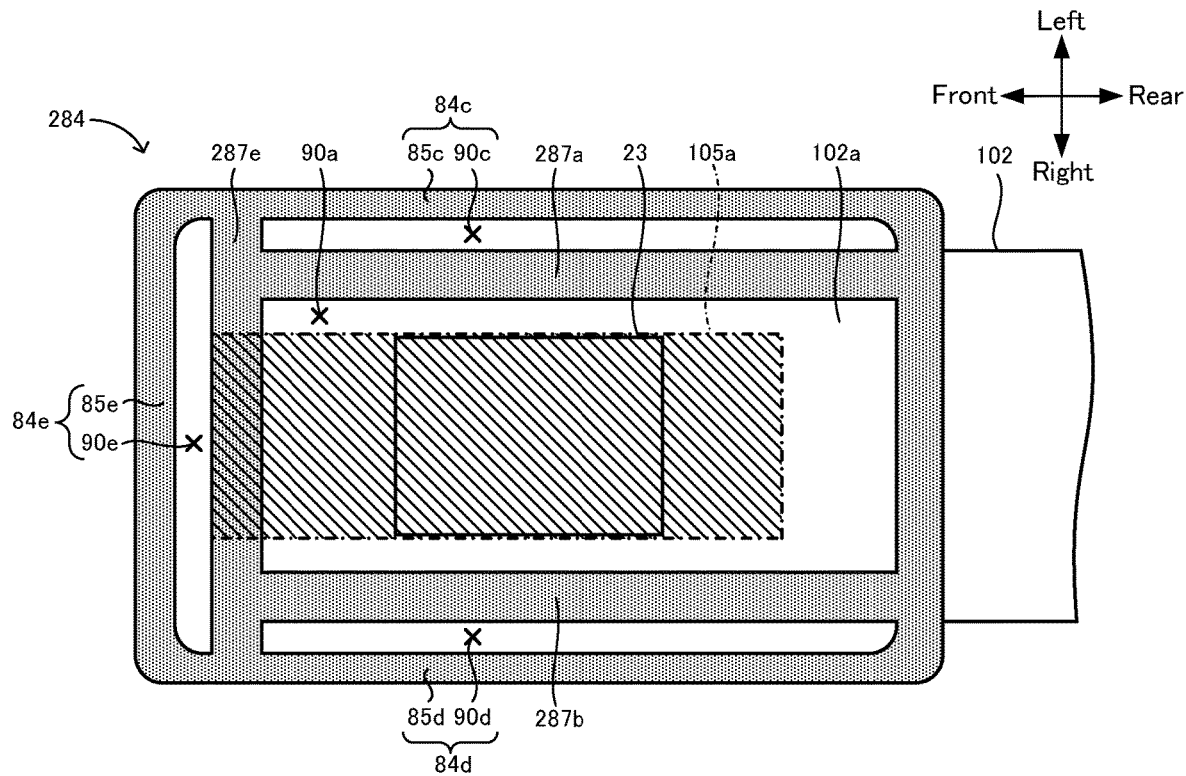
FIG. 11 is a cross-sectional view taken along the section C-C of FIG. 9.

Although the first to fifth internal spaces 90a to 90e are directly communicated with one another in the above-described embodiment, the present invention is not limited to this; for example, the first to fifth internal spaces 90a to 90e are not necessarily communicated with one another directly. FIGS. 9 and 10 are cross-sectional views of a protective layer 284 according to a modification example corresponding to the above case. FIG. 11 is a cross-sectional view taken along the section C-C of FIG. 9. FIGS. 9 and 10 are cross-sectional views similar to FIGS. 3 and 4, respectively. The protective layer 284 does not include an inner protective layer 86 and include an outer protective layer 85, an internal space 90, and first to fifth holding portions 287a to 287e. The first and second holding portions 287a and 287b are interposed between the first surface 102a and the first outer protective layer 85a so as to support the first outer protective layer 85a (see FIGS. 10 and 11). The first holding portion 287a separates the first internal space 90a and the third internal space 90c from each other. The second holding portion 287b separates the first internal space 90a and the fourth internal space 90d from each other. The third and fourth holding portions 287c and 287d are interposed between the second surface 102b and the second outer protective layer 85b so as to support the second outer protective layer 85b (see FIG. 10). The third holding portion 287c separates the second internal space 90b and the third internal space 90c from each other. The fourth holding portion 287d separates the second internal space 90b and the fourth internal space 90d from each other. The fifth holding portion 287e is interposed between the first to fourth surfaces 102a to 102d and the first to fourth outer protective layers 85a to 85d so as to support the first to fourth outer protective layers 85a to 85d (see FIGS. 9 and 11). The fifth holding portion 287e is arranged along the front-end sides of the first to fourth surfaces 102a to 102d so as to surround the periphery of the element body 102 and separates the fifth internal space 90e from the first to fourth internal spaces 90a to 90d. Since the protective layer 284 includes the first to fifth holding portions 287a to 287e, the first to fifth internal spaces 90a to 90e are not directly communicated with one another. Therefore, any of the first to fourth protective layers 84a to 84d of the protective layer 284 does not have an internal space directly communicated with the fifth internal space 90e formed in the fifth protective layer 84e. This reduces the likelihood of the measurement-object gas, which passes through the fifth protective layer 84e and moves toward the gas inlet 10 in a direction perpendicular to the fifth surface 102e, reaching the first to fourth protective layers 84a to 84d. Consequently, the measurement-object gas may be readily introduced into the measurement-object gas flow section 9 and quickly reach the measurement electrode 44. This results in an increase in the responsivity of the sensor element 101. Note that, in the above-described protective layer 284, since the fifth holding portion 287e overlaps the first external wall 105a when the first protective layer 84a is viewed in a direction perpendicular to the first surface 102a, the first overlap ratio of the first internal space 90a does not reach 100% (see FIG. 11). In such a case, it is preferable to determine the width of the fifth holding portion 287e in the front-rear direction such that the first overlap ratio falls within the range of 80% or more. Similarly, since the fifth holding portion 287e is also disposed on the second to fourth surfaces 102b to 102d, the second to fourth overlap ratios do not reach 100%. It is preferable to adjust the second to fourth overlap ratios to be 80% or more.

Figure 12:
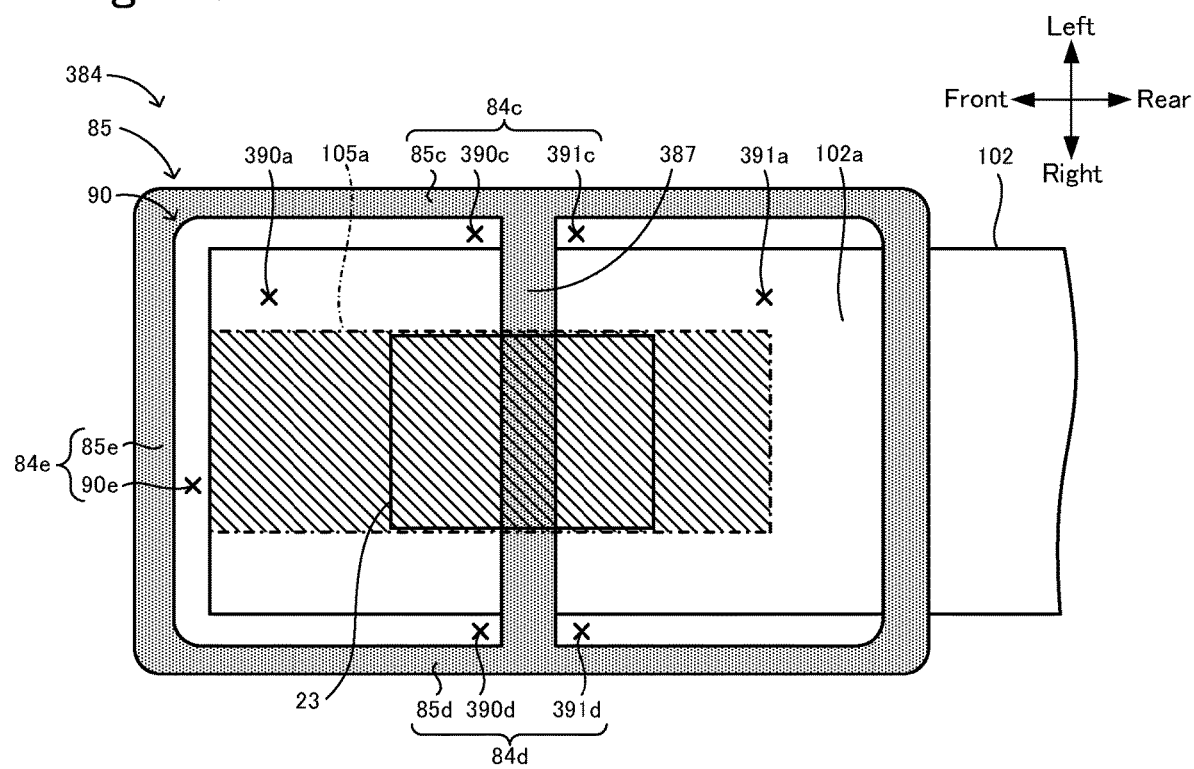
FIG. 12 is a cross-sectional view of a protective layer 384 according to a modification example.

Although the first to fifth protective layers 84a to 84e each have one or more internal spaces in the above-described embodiment, the present invention is not limited to this; each of the first to fifth protective layers 84a to 84e may have two or more internal spaces. FIG. 12 is a cross-sectional view of a protective layer 384 according to a modification example corresponding to the above case. FIG. 12 is a cross-sectional view taken at the same position as in FIG. 11. The protective layer 384 does not include the inner protective layer 86 and includes the outer protective layer 85, the internal space 90, and a holding portion 387. The holding portion 387 is arranged along the first to fourth surfaces 102a to 102d so as to surround the periphery of the element body 102, similarly to the fifth holding portion 287e illustrated in FIGS. 9 and 11. Since the holding portion 387 is present, the first protective layer 84a has two internal spaces separated from each other, that is, first internal spaces 390a and 391a. Similarly, the second to fourth protective layers 84b to 84d each have two internal spaces formed therein. FIG. 12 illustrates third internal spaces 390c and 391c and fourth internal spaces 390d and 391d, while two second internal spaces are not illustrated. In the case where the first protective layer 84a has two or more internal spaces formed therein, the first overlap ratio is determined on the basis of the positional relationship between the first external wall 105a and the entirety of the two or more internal spaces. For example, in FIG. 12, although the overlap ratios of the first internal spaces 390a and 391a with respect to the first external wall 105a are each less than 80%, the overlap ratio exceeds 80% in total. Therefore, it is considered that the first protective layer 84a has an internal space having a first overlap ratio of 80% or more. The second to fifth overlap ratios are determined in the same manner as described above.

Figure 13:
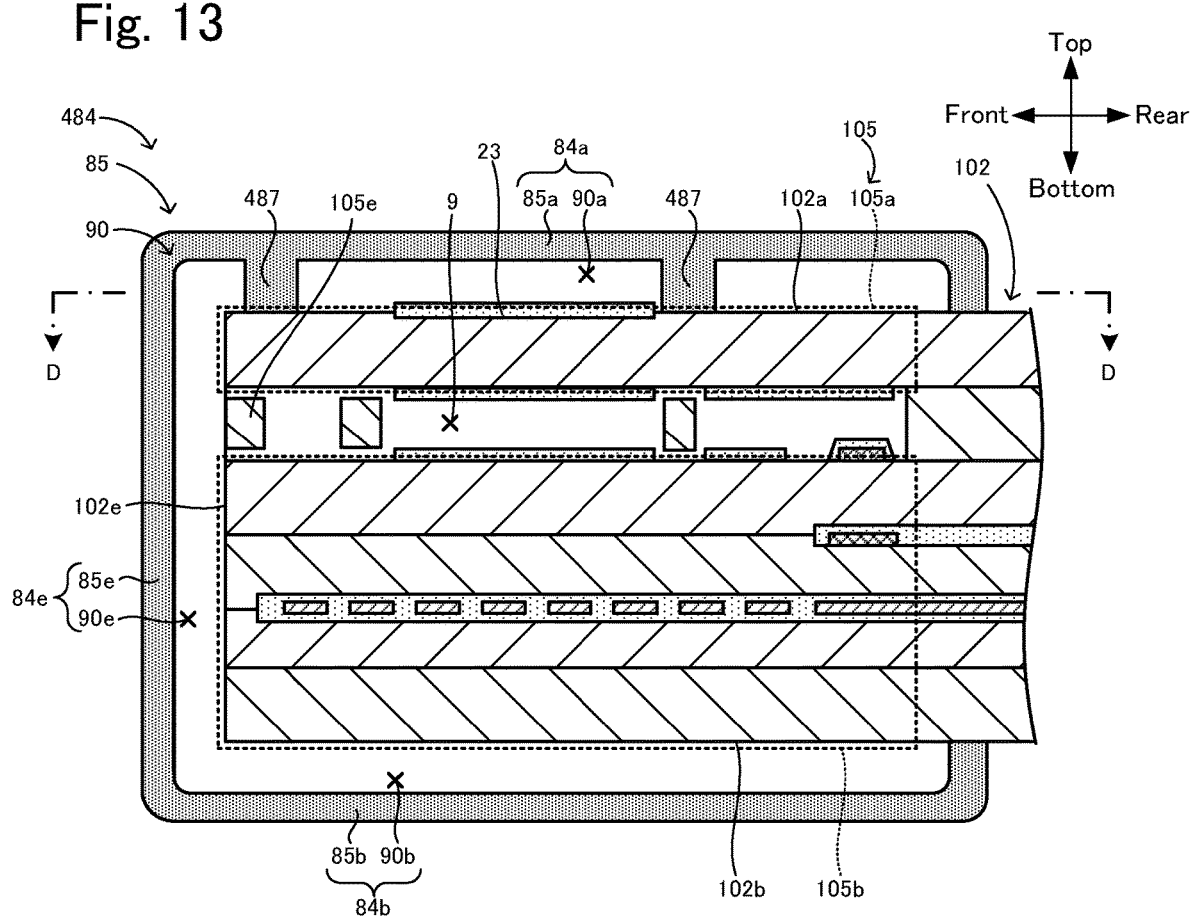
FIG. 13 is a cross-sectional view of a protective layer 484 according to a modification example.
Figure 14:
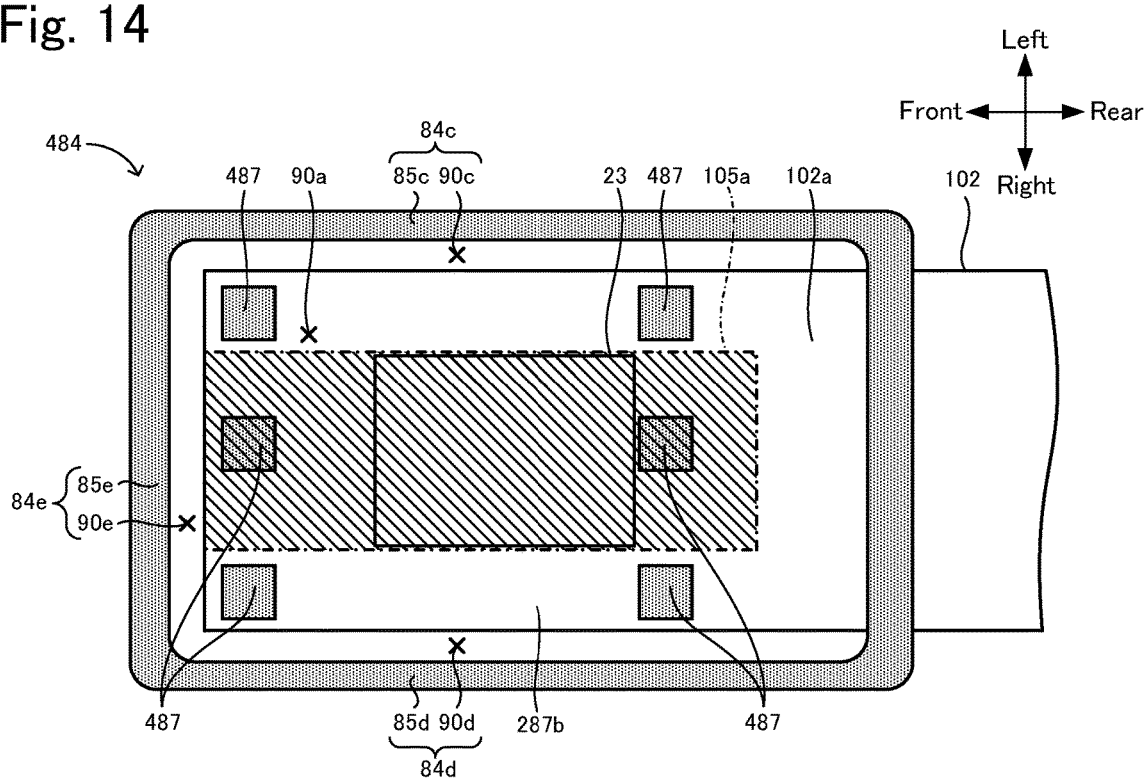
FIG. 14 is a cross-sectional view taken along the section D-D of FIG. 13.

Although the first to fifth holding portions 287a to 287e and the holding portion 387 illustrated in FIGS. 9 to 13 are arranged to separate the spaces from one another, the present invention is not limited to this; a columnar holding portion that does not separate the spaces from one another, such as holding portions 487 included in a protective layer 484 according to a modification example illustrated in FIGS. 13 and 14, may be disposed instead. Although two out of the six holding portions 487 overlap the first external wall 105a when viewed in a direction perpendicular to the first surface 102a, the holding portions 487 may be arranged not to overlap the first external wall 105a.

Figure 15:
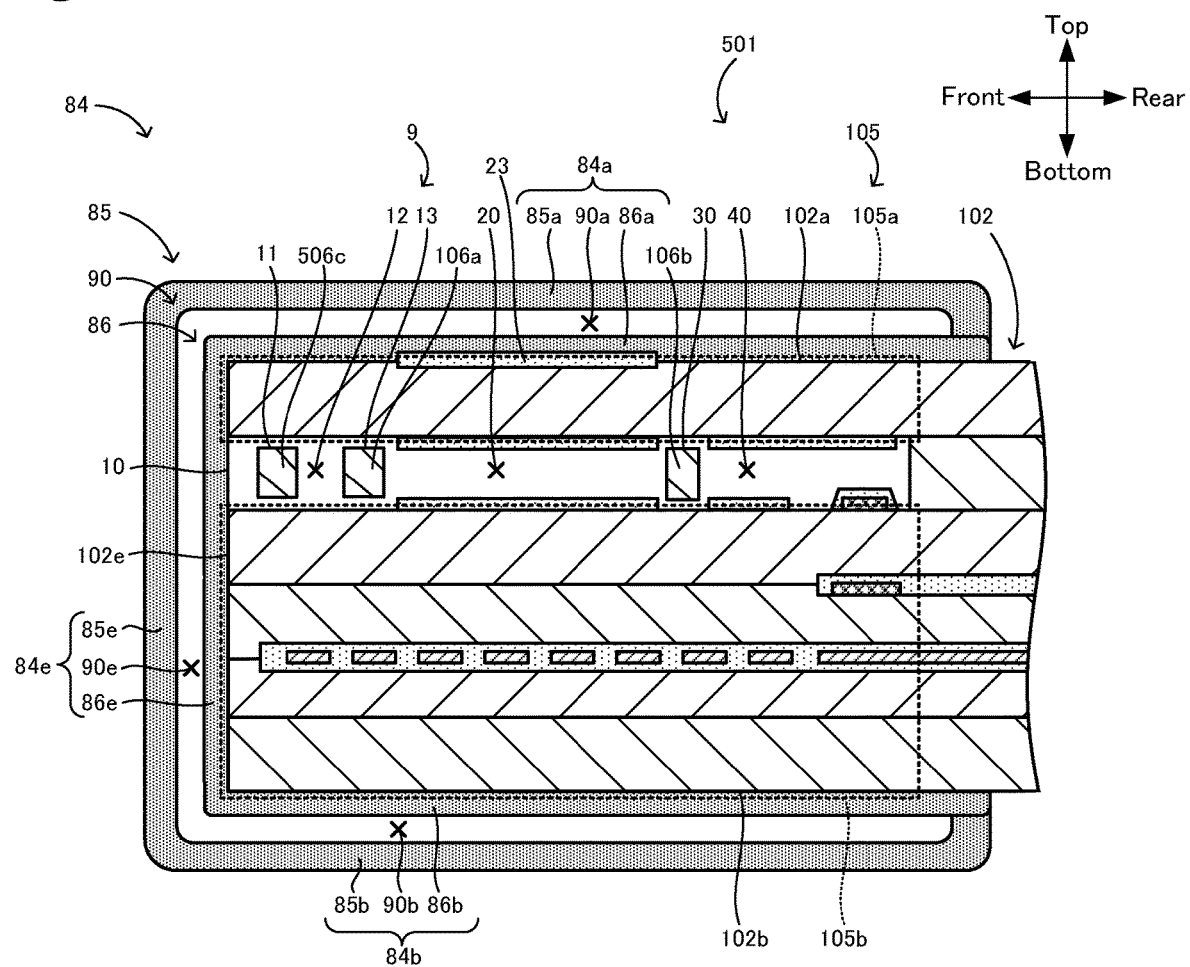
FIG. 15 is a cross-sectional view of a sensor element 501 according to a modification example.

Although the element body 102 includes the first to fifth external walls 105a to 105e in the above-described embodiment, the element body 102 does not necessarily include all of the first to fifth external walls 105a to 105e. For example, in a sensor element 501 according to a modification example illustrated in FIG. 15, a wall portion 506c that forms the first diffusion-controlled portion 11 is disposed inside the measurement-object gas flow section 9 so as to be spaced from the gas inlet 10. Since the wall portion 506c does not include a part of the fifth surface 102e unlike the fifth external wall 105e illustrated in FIG. 3, the wall portion 506c corresponds to an inner wall. Thus, the element body 102 of the sensor element 501 does not include the fifth external wall. In the case where the element body 102 does not include the fifth external wall, the thinnest external wall is the same external wall (i.e., the first external wall 105a) regardless of whether the first or second definition is used.

The relationship between the thicknesses T1 to T5 of the first to fifth external walls 105a to 105e is not limited to the relationship described in the above-described embodiment. For example, the thickness T1 may be the smallest among the thicknesses T1 to T5. In the case where a part of the external wall 105 which is thinner than the fifth external wall 105e is present, the thinnest external wall is the same regardless of whether the first or second definition is used. In the above-described embodiment, since the ceiling surface of the measurement-object gas flow section 9 is flat as illustrated in FIG. 3, the thickness T1 of the first external wall 105a is the same at any position. In the case where the thickness of the first external wall 105a is not uniform, the thickness of the thinnest part of the first external wall 105a is defined as thickness T1. The same applies to the thicknesses T2 to T5.

Although the longitudinal direction of the measurement-object gas flow section 9 is parallel to that of the element body 102 in the above-described embodiment, the present invention is not limited to this. Although the gas inlet 10 of the measurement-object gas flow section 9 is formed in the fifth surface 102e in the above-described embodiment, the gas inlet 10 may be formed in the other surfaces, such as the first surface 102a.

Although not mentioned in the above-described embodiment, each of the first to fifth internal spaces 90a to 90e formed in the protective layer 84 are distinguishable in size from the pores present in the components (e.g., the outer protective layer 85 and the inner protective layer 86) of the protective layer 84. That is, the pores present in the outer protective layer 85 and the inner protective layer 86 are not included in the internal space 90. The internal space 90 (each of the first to fifth internal spaces 90a to 90e) is a space that is different from and larger than the pores present in the protective layer 84. For example, the volume of a part of the first internal space 90a which is present in a region immediately above the first surface 102a may be 0.03 mm$^3$ or more, 0.04 mm$^3$ or more, 0.07 mm$^3$ or more, 0.5 mm$^3$ or more, or 1.5 mm$^3$ or more. The volume of a part of the second internal space 90b which is present in a region immediately below the second surface 102b may be 0.03 mm$^3$ or more, 0.04 mm$^3$ or more, 0.07 mm$^3$ or more, 0.5 mm$^3$ or more, or 1.5 mm$^3$ or more. The volume of a part of the third internal space 90c which is present in a region left of the third surface 102c may be 0.015 mm$^3$ or more, 0.2 mm$^3$ or more, or 0.4 mm$^3$ or more. The volume of a part of the fourth internal space 90d which is present in a region right of the fourth surface 102d may be 0.015 mm³ or more, 0.2 mm³ or more, or 0.4 mm³ or more. The volume of a part of the fifth internal space 90e which is present in a region forward of the fifth surface 102e may be 0.010 mm³ or more, 0.1 mm³ or more, 0.2 mm³ or more, or 0.3 mm³ or more. Note that the expression "region immediately above the first surface 102a" means a region that extends from the first surface 102a in a direction perpendicular to the first surface 102a, which does not include a region above and left of the first surface 102a, a region above and right of the first surface 102a, and the like. The same applies to the expressions "region immediately below the second surface 102b", "region left of the third surface 102c", "region right of the fourth surface 102d", and "region forward of the fifth surface 102e". In the case where the first internal space 90a includes a plurality of spaces, the volume of a part of at least one of the spaces which is present in the region immediately above the first surface 102a may be 0.03 mm³ or more, 0.04 mm³ or more, 0.07 mm³ or more, 0.5 mm³ or more, or 1.5 mm³ or more. Alternatively, the total of the volumes of parts of the spaces which are present in the region immediately above the first surface 102a may be 0.03 mm³ or more, 0.04 mm³ or more, 0.07 mm³ or more, 0.5 mm³ or more, or 1.5 mm³ or more. Similarly, for each of the second to fifth internal spaces 90b to 90e, in the case where the internal space includes a plurality of spaces, at least one of the spaces may satisfy the above volume range. Alternatively, the spaces may satisfy the above volume range in terms of the total of the spaces. The height of the first internal space 90a may be 40% or more and 70% or less of the distance from the first surface 102a to the top surface of the first outer protective layer 85a. Similarly, the height of the second internal space 90b may be 40% or more and 70% or less of the distance from the second surface 102b to the bottom surface of the second outer protective layer 85b. The height of the third internal space 90c may be 40% or more and 70% or less of the distance from the third surface 102c to the left surface of the third outer protective layer 85c. The height of the fourth internal space 90d may be 40% or more and 70% or less of the distance from the fourth surface 102d to the right surface of the fourth outer protective layer 85d. The height of the fifth internal space 90e may be 40% or more and 70% or less of the distance from the fifth surface 102e to the front surface of the fifth outer protective layer 85e. The height of the first internal space 90a may be 5 times or more or 10 times or more the average pore size (by mercury intrusion porosimetry) of the protective layer 84. Similarly, the heights of the second to fifth internal spaces 90b to 90e may be 5 times or more or 10 times or more the average pore size of the protective layer 84.

Although the element body 102 is a layered body including a plurality of solid electrolyte layers (the layers 1 to 6) in the above-described embodiment, the present invention is not limited to this. The element body 102 may be any layered body including at least one oxygen-ion-conductive solid electrolyte layer. For example, the layers 1 to 5, other than the second solid electrolyte layer 6, in FIG. 2 may be structure layers composed of a material other than a solid electrolyte (e.g., layers composed of alumina). In such a case, the electrodes included in the element body 102 are disposed in the second solid electrolyte layer 6. For example, the measurement electrode 44 illustrated in FIG. 2 is disposed on the bottom surface of the second solid electrolyte layer 6. Furthermore, the reference-gas introduction space 43 is formed in the spacer layer 5, but not in the first solid electrolyte layer 4, the air introduction layer 48 is interposed between the second solid electrolyte layer 6 and the spacer layer 5, but not between the first solid electrolyte layer 4 and the third substrate layer 3, and the reference electrode 42 is disposed on the bottom surface of the second solid electrolyte layer 6 at a position rearward of the second internal space 40.

Although a gas sensor 100 that detects NOx concertation is described as an example in the above-described embodiment, the present invention may be applied to a gas sensor that detects oxygen concentration and a gas sensor that detects ammonia concentration.

EXAMPLES

Examples where the above-described sensor element was specifically prepared are described below as Examples. Test Examples 1 to 8, 13, and 14 correspond to Examples of the present invention, while Test Examples 9 to 12 and 15 to 30 correspond to Comparative Examples. Note that the present invention is not limited by Examples below.

Test Example 1

In Test Example 1, a sensor element 101 having the structure illustrated in FIGS. 1 to 7 was prepared by the method described below, except that the inner protective layer 86 was omitted. In other words, a protective layer 84 included in the sensor element 101 prepared in Test Example 1 had the same structure as the protective layer 184 illustrated in FIG. 8. First, an element body 102 as described in FIGS. 1 to 4, which had a length of 67.5 mm, a width of 4.25 mm, and a thickness of 1.45 mm, was prepared. In the preparation of the element body 102, ceramic green sheets corresponding to the layers 1 to 6 were prepared by mixing zirconia particles including 4 mol % yttria serving as a stabilizer with an organic binder and an organic solvent and subsequently performing tape casting. After patterns of electrodes, etc. had been printed on each of the six green sheets, the six green sheets were stacked on top of one another and the resulting layered body was baked. Hereby, an element body 102 was prepared. The element body 102 was prepared such that the thicknesses T1 to T5 of the first to fifth external walls 105a to 105e satisfied the following relationship as in the above-described embodiment: T5<T1<T3=T4<T2.

Subsequently, a protective layer 184, that is, an internal space 90 and an outer protective layer 85, were formed on the element body 102. Specifically, first, a vanishing body composed of a vinyl resin was formed on the first to fifth surfaces 102a to 102e of the element body 102 by screen printing. The vanishing body was formed in a shape of the internal space 90 (first to fifth internal spaces 90a to 90e). Then, an outer protective layer 85 (first to fifth outer protective layers 85a to 85e) was formed on the surface of the vanishing body by plasma spraying with a plasma spray gun ("SinplexPro-90" produced by Oerlikon Metco). In the formation of the outer protective layer 85, plasma spraying was performed under the following conditions. A mixture of an argon gas (flow rate: 50 L/min) and hydrogen (flow rate: 2 L/min) was used as a gas for plasma generation. The voltage applied for plasma generation was a direct-current voltage of 100 V. The current was 200 A. The raw material particles (powder spray material) used to form the outer protective layer 85 were alumina powder particles having an average particle size of 30 μm. The carrier gas used for feeding of the raw material particles was an argon gas (flow rate: 5 L/min). Plasma gun spraying was performed on the first to fifth surfaces 102a to 102e in directions perpendicular to the first to fifth surfaces 102a to 102e, respectively. The distance between the plasma gun and each of the first to fifth surfaces 102a to 102e was 120 mm. Plasma spraying was performed in air atmosphere at normal temperature. After the outer protective layer 85 had been formed in the above-described manner, the vanishing body was removed by combustion to form an internal space 90. Hereby, a sensor element 101 of Test Example 1 was prepared. As illustrated in FIGS. 3 to 7, in the sensor element 101 prepared in Test Example 1, the first to fifth internal spaces 90a to 90e were directly communicated with adjacent spaces. The internal space 90 formed one space as a whole. Furthermore, in the sensor element 101 prepared in Test Example 1, all of the first to fifth overlap ratios were 100%. The first to fifth outer protective layers 85a to 85e all had a thickness of 200 μm and a porosity of 20%. The first to fifth internal spaces 90a to 90e had a thickness of 200 μm.

Test Examples 2 to 6

Figure 16:
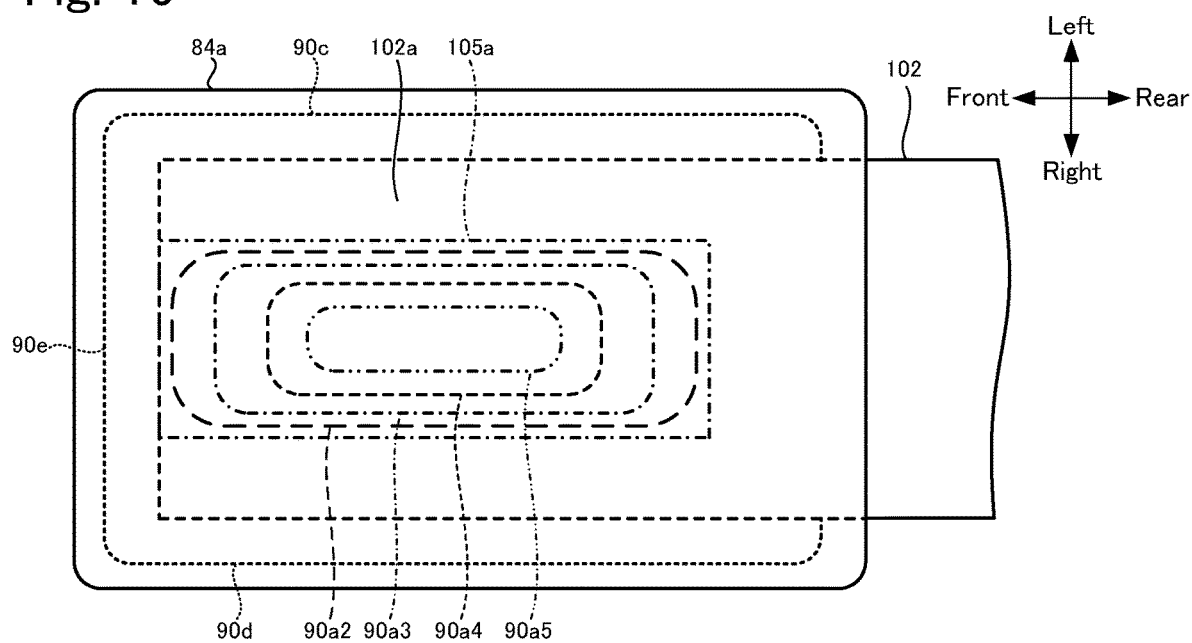
FIG. 16 is a diagram for explaining first internal spaces 90a2 to 90a5 formed in Test Examples 2 to 5.

In Test Examples 2 to 6, a sensor element 101 was prepared as in Test Example 1, except that the shape of the first internal space 90a was changed such that the first overlap ratio was reduced to be less than 100%, while the second to fifth overlap ratios were maintained to be 100%. In Test Examples 2 to 6, the first overlap ratio was set to 80%, 60%, 40%, 20%, and 0%, respectively. FIG. 16 illustrates the shapes of the first internal spaces 90a formed in Test Examples 2 to 5. FIG. 16 is a partial top view of the sensor element 101. In FIG. 16, the first internal spaces 90a of Test Examples 2 to 5 are distinguished from one another as first internal spaces 90a2 to 90a5, respectively. As illustrated in FIG. 16, the first internal spaces 90a2 to 90a5 of Test Examples 2 to 5 were formed such that both lengths and widths of the first internal spaces 90a2 to 90a5 in the front-rear and left-right directions, respectively, gradually decreased in order from Test Example 2 to Test Example 5. The first internal spaces 90a2 to 90a5 were each arranged such that the center of the first internal space coincided with the center of the first external wall 105a when viewed in a direction perpendicular to the first surface 102a. As illustrated in FIG. 16, the first internal spaces 90a of Test Examples 2 to 5 were each not directly communicated with any of the second to fifth internal spaces 90b to 90e. In Test Example 6, the protective layer 84 did not have a first internal space 90a.

Test Examples 7 to 12

In Test Example 7, a sensor element 101 was prepared as in Test Example 1, except that the protective layer 84 had the fifth internal space 90e and did not have the first to fourth internal spaces 90a to 90d. Thus, in Test Example 7, the first to fourth overlap ratios were all 0% and the fifth overlap ratio was 100%. In Test Examples 8 to 12, a sensor element 101 was prepared as in Test Example 7, except that the shape of the fifth internal space 90e was changed such that the fifth overlap ratio was reduced to be less than 100%, while the first to fourth overlap ratios were maintained to be 0%. In Test Examples 8 to 12, the fifth overlap ratio was set to 80%, 60%, 40%, 20%, and 0%, respectively. In Test Examples 8 to 11, the shape of the fifth internal space 90e was changed as for the first internal space 90a in Test Examples 2 to 5. Specifically, in Test Examples 8 to 11, the fifth internal space 90e was formed such that the size of the fifth internal space 90e decreased gradually in order from Test Example 8 to Test Example 11. Moreover, in Test Examples 8 to 11, the fifth internal space 90e was arranged such that the center of the fifth internal space 90e coincided with the center of the fifth external wall 105e when viewed in a direction perpendicular to the fifth surface 102e. In Test Example 12, the protective layer 84 did not have any internal space 90, such as a fifth internal space 90e.

Test Examples 13 to 18

In Test Example 13, a sensor element 101 was prepared as in Test Example 1, except that the protective layer 84 had the first internal space 90a and did not have the second to fifth internal spaces 90b to 90e. Thus, in Test Example 13, the second to fifth overlap ratios were all 0% and the first overlap ratio was 100%. In Test Examples 14 to 18, a sensor element 101 was prepared as in Test Example 13, except that the shape of the first internal space 90a was changed such that the first overlap ratio was reduced to be less than 100%, while the second to fifth overlap ratios were maintained to be 0%. In Test Examples 14 to 18, the first overlap ratio was set to 80%, 60%, 40%, 20%, and 0%, respectively. In Test Examples 14 to 17, the shape of the first internal space 90a was changed as for the first internal space 90a in Test Examples 2 to 5, as illustrated in FIG. 16. In Test Example 18, the protective layer 84 did not have any internal space 90, such as a first internal space 90a.

Test Examples 19 to 24

In Test Example 19, a sensor element 101 was prepared as in Test Example 1, except that the protective layer 84 had the second internal space 90b and did not have the first and third to fifth internal spaces 90a and 90c to 90e. Thus, in Test Example 19, the first and third to fifth overlap ratios were all 0% and the second overlap ratio was 100%. In Test Examples 20 to 24, a sensor element 101 was prepared as in Test Example 19, except that the shape of the second internal space 90b was changed such that the second overlap ratio was reduced to be less than 100%, while the first and third to fifth overlap ratios were maintained to be 0%. In Test Examples 20 to 24, the second overlap ratio was set to 80%, 60%, 40%, 20%, and 0%, respectively. In Test Examples 20 to 23, the shape of the second internal space 90b was changed as for the first internal space 90a in Test Examples 2 to 5. Specifically, in Test Examples 20 to 23, the second internal space 90b was formed such that the size of the second internal space 90b decreased gradually in order from Test Example 20 to Test Example 23. Moreover, in Test Examples 20 to 23, the second internal space 90b was arranged such that the center of the second internal space 90b coincided with the center of the second external wall 105b when viewed in a direction perpendicular to the second surface 102b. In Test Example 24, the protective layer 84 did not have any internal space 90, such as a second internal space 90b.

Test Examples 25 to 30

In Test Example 25, a sensor element 101 was prepared as in Test Example 1, except that the protective layer 84 had the third internal space 90c and did not have the first, second, fourth, and fifth internal spaces 90a, 90b, 90d, and 90e. Thus, in Test Example 25, the first, second, fourth, and fifth overlap ratios were all 0% and the third overlap ratio was 100%. In Test Examples 26 to 30, a sensor element 101 was prepared as in Test Example 25, except that the shape of the third internal space 90c was changed such that the third overlap ratio was reduced to be less than 100%, while the first, second, fourth, and fifth overlap ratios were maintained to be 0%. In Test Examples 26 to 30, the third overlap ratio was set to 80%, 60%, 40%, 20%, and 0%, respectively. In Test Examples 26 to 29, the shape of the third internal space 90c was changed as for the first internal space 90a in Test Examples 2 to 5. Specifically, in Test Examples 26 to 29, the third internal space 90c was formed such that the size of the third internal space 90c decreased gradually in order from Test Example 26 to Test Example 29. Moreover, in Test Examples 26 to 29, the third internal space 90c was arranged such that the center of the third internal space 90c coincided with the center of the third external wall 105c when viewed in a direction perpendicular to the third surface 102c. In Test Example 30, the protective layer 84 did not have any internal space 90, such as a third internal space 90c.

Note that the sensor elements 101 prepared in Test Examples 12, 18, 24, and 30 were substantially the same as one another, since they did not have any internal space 90.

[Waterproofing Performance Evaluation]

The sensor elements 101 prepared in Test Examples 1 to 30 were evaluated in terms of the waterproofing performance of the element body 102. Specifically, first, the temperature of the heater 72 was increased to 800° C. by energizing the heater 72, in order to heat the sensor element 101. Under the above conditions, in air atmosphere, the main pump cell 21, the auxiliary pump cell 50, the main pump controlling oxygen partial pressure detection sensor cell 80, the auxiliary pump controlling oxygen partial pressure detection sensor cell 81, etc. were actuated to maintain the oxygen concentration inside the first internal space 20 to be a predetermined constant value. After the pump current Ip0 had become stable, water droplets were dropped to the protective layer 84 and whether the element body 102 was cracked was determined on the basis of whether the pump current Ip0 was changed to a value exceeding the predetermined threshold. If the element body 102 is cracked due to the thermal shock caused by the water droplet, oxygen is likely to enter the first internal space 20 through the cracked part and, consequently, the pump current Ip0 is increased. Thus, it was considered that the element body 102 was cracked due to water droplets when the pump current Ip0 exceeded the threshold predetermined in the test. The test was conducted a plurality of times while the amount of the water droplets was gradually increased. The maximum amount of water droplets at which cracking did not occur was defined as waterproofing amount. For each of Test Examples 1 to 30, the waterproofing amount was calculated as the average of the waterproofing amounts of ten sensor elements 101. The larger the waterproofing amount, the higher the waterproofing performance of the element body 102. The position at which the water droplets were dropped to the sensor element 101 was a part of the surface of the outer protective layer 85 which is closer to one of the first to fifth internal spaces 90a to 90e the overlap ratio of which was to be changed. Specifically, in Test Examples 1 to 6 and 13 to 18, where the first overlap ratio of the first internal space 90a was changed, water droplets were dropped to the center of the surface of the first outer protective layer 85a in both front-rear and left-right directions. Similarly, in the tests conducted in Test Examples 7 to 12, water droplets were dropped to the center of the surface of the fifth outer protective layer 85e in both top-bottom and left-right directions. In the tests conducted in Test Examples 19 to 24, water droplets were dropped to the center of the surface of the second outer protective layer 85b in both front-rear and left-right directions. In the tests conducted in Test Examples 25 to 30, water droplets were dropped to the center of the surface of the third outer protective layer 85c in both top-bottom and front-rear directions.

Table 1 lists the first to fifth overlap ratios and the waterproofing amount measured in each of the Test Examples 1 to 30.

TABLE 1

| | First Overlap Ratio [%] | Second Overlap Ratio [%] | Third Overlap Ratio [%] | Fourth Overlap Ratio [%] | Fifth Overlap Ratio [%] | Waterproofing Amount [μL] |
|---|---|---|---|---|---|---|
| Test Example 1 | 100 | 100 | 100 | 100 | 100 | 35 |
| Test Example 2 | 80 | 100 | 100 | 100 | 100 | 32 |
| Test Example 3 | 60 | 100 | 100 | 100 | 100 | 18 |
| Test Example 4 | 40 | 100 | 100 | 100 | 100 | 12 |
| Test Example 5 | 20 | 100 | 100 | 100 | 100 | 8 |
| Test Example 6 | 0 | 100 | 100 | 100 | 100 | 6 |
| Test Example 7 | 0 | 0 | 0 | 0 | 100 | 22 |
| Test Example 8 | 0 | 0 | 0 | 0 | 80 | 21 |
| Test Example 9 | 0 | 0 | 0 | 0 | 60 | 14 |
| Test Example 10 | 0 | 0 | 0 | 0 | 40 | 8 |
| Test Example 11 | 0 | 0 | 0 | 0 | 20 | 6 |
| Test Example 12 | 0 | 0 | 0 | 0 | 0 | 5 |
| Test Example 13 | 100 | 0 | 0 | 0 | 0 | 21 |
| Test Example 14 | 80 | 0 | 0 | 0 | 0 | 20 |
| Test Example 15 | 60 | 0 | 0 | 0 | 0 | 10 |
| Test Example 16 | 40 | 0 | 0 | 0 | 0 | 8 |
| Test Example 17 | 20 | 0 | 0 | 0 | 0 | 6 |
| Test Example 18 | 0 | 0 | 0 | 0 | 0 | 5 |
| Test Example 19 | 0 | 100 | 0 | 0 | 0 | 12 |
| Test Example 20 | 0 | 80 | 0 | 0 | 0 | 10 |
| Test Example 21 | 0 | 60 | 0 | 0 | 0 | 9 |
| Test Example 22 | 0 | 40 | 0 | 0 | 0 | 6 |
| Test Example 23 | 0 | 20 | 0 | 0 | 0 | 5 |
| Test Example 24 | 0 | 0 | 0 | 0 | 0 | 5 |
| Test Example 25 | 0 | 0 | 100 | 0 | 0 | 8 |
| Test Example 26 | 0 | 0 | 80 | 0 | 0 | 8 |
| Test Example 27 | 0 | 0 | 60 | 0 | 0 | 6 |
| Test Example 28 | 0 | 0 | 40 | 0 | 0 | 5 |
| Test Example 29 | 0 | 0 | 20 | 0 | 0 | 5 |
| Test Example 30 | 0 | 0 | 0 | 0 | 0 | 5 |

The results obtained in Test Examples 7 to 12 confirm the following. In Test Examples 7 and 8, where the fifth overlap ratio, that is, the overlap ratio of the fifth internal space 90e with respect to the fifth external wall 105e, which is the thinnest external wall based on the first definition, was 80% or more, a large waterproofing amount of 20 μL or more was observed. Furthermore, it was confirmed that the waterproofing performance of the element body 102 was higher in Test Examples 7 and 8 than in Test Examples 9 to 12, where the fifth overlap ratio was less than 80%.

The results obtained in Test Examples 13 to 18 confirm the following. In Test Examples 13 and 14, where the first overlap ratio, that is, the overlap ratio of the first internal space 90a with respect to the first external wall 105a, which is the thinnest external wall based on the second definition, was 80% or more, a large waterproofing amount of 20 μL or more was observed. Furthermore, it was confirmed that the waterproofing performance of the element body 102 was higher in Test Examples 13 and 14 than in Test Examples 15 to 18, where the first overlap ratio was less than 80%.

The waterproofing amounts observed in Test Examples 7, 8, 13, and 14 were all larger than any of those observed in Test Examples 19 to 30. This confirms that setting the first or fifth overlap ratio, which is an overlap ratio corresponding to the thinnest external wall, to be 80% or more enhanced the waterproofing performance of the element body 102 to a higher degree than increasing the second or third overlap ratio, which is an overlap ratio corresponding to the second external wall 105b or the third external wall 105c, which is neither the thinnest external wall based on the first definition nor the thinnest external wall based on the second definition.

It was confirmed also in Test Examples 1 to 6 that setting the first overlap ratio to be 80% or more enhanced waterproofing performance as in the results obtained in Test Examples 13 to 18. In general, the waterproofing amount was larger in Test Examples 1 to 6 than in Test Examples 7 to 30. This is presumably because the sensor elements 101 prepared in Test Examples 1 to 6 all had at least the second to fifth internal spaces 90b to 90e, while only one of the first to fifth internal spaces 90a to 90e was present at most in Test Examples 7 to 30, and the cracking of parts of the external wall 105 of the element body 102 which were other than the thinnest external wall was reduced consequently. In particular, it was confirmed that, in Test Examples 1 and 2, where all of the first to fifth overlap ratios were 80% or more, waterproofing performance was enhanced to a higher degree than in Test Examples 3 to 30.

Note that, in Test Examples 3 to 6, although the fifth overlap ratio, which is an overlap ratio corresponding to the thinnest external wall based on the first definition (the fifth external wall 105e), was 100%, the waterproofing amount was smaller than in Test Example 7, where the fifth overlap ratio was 100% also. This is presumably because of the position at which the water droplets were dropped in the measurement of the waterproofing amount. Specifically, it is considered that, since the water droplets were dropped onto the surface of the first outer protective layer 85a in the measurement of the waterproofing amount in Test Examples 3 to 6, the waterproofing amount was reduced as a result of the small first overlap ratio having a larger impact than the large fifth overlap ratio. It is considered that, in Test Example 7, where the water droplets were dropped onto the surface of the fifth outer protective layer 85e in the measurement of the waterproofing amount, the waterproofing amount was increased as a result of the large fifth overlap ratio having a large impact. Therefore, it is considered that, if the water droplets were dropped onto the surface of the fifth outer protective layer 85e in Test Examples 3 to 6, as in Test Example 7, the waterproofing amount would be substantially equal to or larger than that measured in Test Example 7.

Although a test in which the fourth overlap ratio is changed was not conducted, it is considered that the results of a test in which only the fourth overlap ratio is changed while the first to third and fifth overlap ratios are set to 0% are substantially the same as in Test Examples 25 to 30, since the element body 102 illustrated in FIGS. 1 to 7 is substantially symmetrical bilaterally and the thickness T3 of the third external wall 105c and the thickness T4 of the fourth external wall 105d are equal to each other as described above.

The present application claims priority from Japanese Patent Application No. 2019-211702, filed on Nov. 22, 2019, Japanese Patent Application No. 2019-033351, filed on Feb. 26, 2019, and Japanese Patent Application No. 2019-200859, filed on Nov. 5, 2019, the entire contents of which are incorporated herein by reference.

What is claimed is:

1. A sensor element comprising:
an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;
a measurement electrode disposed on an inner peripheral surface of the measurement-object gas flow section; and
a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side,
wherein the element body includes two or more external walls extending from the measurement-object gas flow section to two or more of the first to fifth surfaces, respectively,
wherein, when a thinnest one of external walls constituting the element body is defined as a thinnest external wall and one of the first to fifth surfaces which corresponds to the thinnest external wall is defined as a closest surface, a part of the protective layer which covers the closest surface overlaps the entirety of the thinnest external wall when viewed in a direction perpendicular to the closest surface, and
wherein the part of the protective layer which covers the closest surface has one or more internal spaces formed therein, the one or more internal spaces overlapping 80% or more of the thinnest external wall when viewed in the direction perpendicular to the closest surface.

2. A sensor element comprising:
an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;
a measurement electrode disposed on an inner peripheral surface of the measurement-object gas flow section; and a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side, wherein a longitudinal direction of the measurement-object gas flow section is the same as the longitudinal direction of the element body, wherein the element body includes first to fifth external walls extending from the measurement-object gas flow section to the first to fifth surfaces, respectively, wherein, when a thinnest one of the first to fourth external walls is defined as a thinnest external wall and one of the first to fourth surfaces which corresponds to the thinnest external wall is defined as a closest surface, a part of the protective layer which covers the closest surface overlaps the entirety of the thinnest external wall when viewed in a direction perpendicular to the closest surface, and wherein the part of the protective layer which covers the closest surface has one or more internal spaces formed therein, the one or more internal spaces overlapping 80% or more of the thinnest external wall when viewed in the direction perpendicular to the closest surface.

3. The sensor element according to claim 1,
wherein the one or more internal spaces overlap 100% of the thinnest external wall when viewed in the direction perpendicular to the closest surface.

4. The sensor element according to claim 1,
wherein, for each of one or more of the first to fifth surfaces except the closest surface, a part of the protective layer which covers the surface has one or more internal spaces formed therein, the one or more internal spaces overlapping 80% or more of one of the external walls which corresponds to the surface when viewed in a direction perpendicular to the surface.

5. The sensor element according to claim 1,
wherein the two or more external walls of the element body include first to fifth external walls extending from the measurement-object gas flow section to the first to fifth surfaces, respectively, and
wherein, for each of four surfaces that are the first to fifth surfaces except the closest surface, a part of the protective layer which covers the surface has one or more internal spaces formed therein, the one or more internal spaces overlapping 80% or more of one of the external walls which corresponds to the surface when viewed in a direction perpendicular to the surface.

6. The sensor element according to claim 1,
wherein the part of the protective layer which covers the closest surface includes an outer protective layer and an inner protective layer, the outer protective layer being arranged closer to the outside of the sensor element than the one or more internal spaces, the inner protective layer being arranged closer to the inside of the sensor element than the one or more internal spaces, the inner protective layer being arranged in contact with the closest surface.

7. The sensor element according to claim 1,
wherein a gas inlet opens on the fifth surface of the element body, the gas inlet serving as an inlet of the measurement-object gas flow section,
wherein a part of the protective layer which covers the fifth surface has an internal space formed therein, and
wherein a part of the protective layer which covers the first to fourth surfaces does not have an internal space directly communicated with the internal space formed in the part of the protective layer which covers the fifth surface.

8. A gas sensor comprising a sensor element which comprises:
an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;
a measurement electrode disposed on an inner peripheral surface of the measurement-object gas flow section; and
a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side,
wherein the element body includes two or more external walls extending from the measurement-object gas flow section to two or more of the first to fifth surfaces, respectively,
wherein, when a thinnest one of external walls constituting the element body is defined as a thinnest external wall and one of the first to fifth surfaces which corresponds to the thinnest external wall is defined as a closest surface, a part of the protective layer which covers the closest surface overlaps the entirety of the thinnest external wall when viewed in a direction perpendicular to the closest surface, and
wherein the part of the protective layer which covers the closest surface has one or more internal spaces formed therein, the one or more internal spaces overlapping 80% or more of the thinnest external wall when viewed in the direction perpendicular to the closest surface.

9. The sensor element according to claim 2,
wherein the one or more internal spaces overlap 100% of the thinnest external wall when viewed in the direction perpendicular to the closest surface.

10. The sensor element according to claim 2,
wherein, for each of one or more of the first to fifth surfaces except the closest surface, a part of the protective layer which covers the surface has one or more internal spaces formed therein, the one or more internal spaces overlapping 80% or more of one of the external walls which corresponds to the surface when viewed in a direction perpendicular to the surface.

11. The sensor element according to claim 2,
wherein, for each of four surfaces that are the first to fifth surfaces except the closest surface, a part of the protective layer which covers the surface has one or more internal spaces formed therein, the one or more internal spaces overlapping 80% or more of one of the external walls which corresponds to the surface when viewed in a direction perpendicular to the surface.

12. The sensor element according to claim 2,
wherein the part of the protective layer which covers the closest surface includes an outer protective layer and an inner protective layer, the outer protective layer being arranged closer to the outside of the sensor element than the one or more internal spaces, the inner protective layer being arranged closer to the inside of the sensor element than the one or more internal spaces, the inner protective layer being arranged in contact with the closest surface.

13. The sensor element according to claim 2,
wherein a gas inlet opens on the fifth surface of the element body, the gas inlet serving as an inlet of the measurement-object gas flow section,
wherein a part of the protective layer which covers the fifth surface has an internal space formed therein, and
wherein a part of the protective layer which covers the first to fourth surfaces does not have an internal space directly communicated with the internal space formed in the part of the protective layer which covers the fifth surface.

14. A gas sensor comprising a sensor element which comprises:
an element body having an elongate rectangular parallelepiped shape and including an oxygen-ion-conductive solid electrolyte body, the element body having a measurement-object gas flow section formed therein, the measurement-object gas flow section through which a measurement-object gas is introduced and flows;
a measurement electrode disposed on an inner peripheral surface of the measurement-object gas flow section; and
a porous protective layer arranged to cover a fifth surface of the element body and first to fourth surfaces of the element body, the fifth surface being an end surface of the element body in a longitudinal direction of the element body, the first to fourth surfaces being arranged to touch the fifth surface along a side,
wherein a longitudinal direction of the measurement-object gas flow section is the same as the longitudinal direction of the element body,
wherein the element body includes first to fifth external walls extending from the measurement-object gas flow section to the first to fifth surfaces, respectively,
wherein, when a thinnest one of the first to fourth external walls is defined as a thinnest external wall and one of the first to fourth surfaces which corresponds to the thinnest external wall is defined as a closest surface, a part of the protective layer which covers the closest surface overlaps the entirety of the thinnest external wall when viewed in a direction perpendicular to the closest surface, and
wherein the part of the protective layer which covers the closest surface has one or more internal spaces formed therein, the one or more internal spaces overlapping 80% or more of the thinnest external wall when viewed in the direction perpendicular to the closest surface.

* * * * *